United States Patent
Xu

(10) Patent No.: US 10,562,798 B2
(45) Date of Patent: Feb. 18, 2020

(54) CONTAMINATE REMOVAL USING ALUMINUM-DOPED MAGNETIC NANOPARTICLES

(71) Applicant: Georgia Tech Research Corporation, Atlanta, GA (US)

(72) Inventor: Jie Xu, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 230 days.

(21) Appl. No.: 15/612,667

(22) Filed: Jun. 2, 2017

(65) Prior Publication Data

US 2017/0349459 A1    Dec. 7, 2017

Related U.S. Application Data

(60) Provisional application No. 62/345,482, filed on Jun. 3, 2016.

(51) Int. Cl.
*B01D 15/02* (2006.01)
*B01D 15/38* (2006.01)
*C02F 1/48* (2006.01)
*C02F 101/10* (2006.01)

(52) U.S. Cl.
CPC .............. *C02F 1/488* (2013.01); *B01D 15/02* (2013.01); *B01D 15/3885* (2013.01); *C02F 2101/105* (2013.01); *C02F 2305/08* (2013.01)

(58) Field of Classification Search
CPC ..... B01D 15/02; B01D 15/3885; C02F 1/448; C02F 2101/105; C02F 2103/22; C02F 2303/16; C02F 2305/08
See application file for complete search history.

(56) References Cited

U.S. PATENT DOCUMENTS

2010/0243571 A1* 9/2010 Semiat .................... B01J 20/06
210/668

OTHER PUBLICATIONS

Urano et al; Ind. Eng. Chem. Res. 1992, 31, 1510-1513. (Year: 1992).*
Heilmann, et al., "Phosphorus Reclaration Through Hydrothermal Carbonization of Animal Manures," Environ. Sci. Technol. (2014) pp. 10323-10329.
Correll, David L., "The Role of Phosphorus in the Eutrophication of Receiving Waters: A Review," J. Environ. Qual (1998) 27:261-266. Quality Criteria for Water (1986) EPA 440/5-86-001.
Pratt, et al., "Biologically and Chemically Mediated Adsorption and Precipitation of Phosphorus from Wastewater," (2012) Current Opinion in Biotechnology 23:890-896 (www.sciencedirect.com).
Daigger and Littleton, "Simultaneous Biological Nutrient Removal: A State-of-the-Art Review," Water Environment Research vol. 86, No. 3 pp. 245-257.

(Continued)

*Primary Examiner* — Pranav N Patel
(74) *Attorney, Agent, or Firm* — Troutman Sanders LLP; Ryan A. Schneider

(57) ABSTRACT

Embodiments of the present disclosure can include a method for isolating a contaminate from water comprising: introducing a plurality of aluminum-doped nanoparticles to water, the water comprising the contaminate; contacting the plurality of aluminum-doped nanoparticles with the contaminate to form contaminate-adsorbed nanoparticles; and isolating the contaminate-adsorbed nanoparticles by applying a magnetic field to the water.

19 Claims, 17 Drawing Sheets

(56) References Cited

OTHER PUBLICATIONS

Guo, et al., "Emerging Technologies for Phosphorus Removal and Recovery: A Review," Applied Mechanics and Materials (2014) vol. 507, pp. 702-706.
Kamika, et al., "The mpact of Microbial Ecology and Chemical Profile on the Enhanced Biological Phosphorus Removal (EBPR) Process: A Case Study of Northern Wastewater Treatment Works, Johannesburg," Int. J. Environ. Res. Public Health (2014), pp. 28786-2898.
Henze, et al., Biological Wastewater Treatment Principles, Modelling and Design, (2008), IWA Publishing.
Nguyen, et al., "Modification of Agricultural Waste/By-products for Enhanced Phosphate Removal and Recovery: Potential and Obstacles," Bioresource Technology (2014) 169:750-762.
Sun, et al., "Effect of Long-Term Organic Removal on Ion Exchange Properties and Performance During Sewage Tertiary Treatment by Conventional Anion Exchange Resins," Chemosphere (2015) 136:181-189.
Sendrowski & Boyer, "Phosphate Removal form Urine Using Hybrid Anion Exchange Resin," Desalination (2013) 322:104-112.
Kim, et al., "Simultaneous Removal of Phosphate and Nitrate in Wastewater Using High-Capacity Anion-Exchange Resin," Water Air Soil Pollut (2012) 223:5959-5966.
Wilfert, et al., "The Relevance of Phosphorus and Iron Chemistry tot he Recovery of Phosphorus from Wastewater: A Review," environ. Sci. Technol. (2015) 49:9400-9414.
Georgantas and Grigoropoulou, "Orthophospate and Metaphosphate Ion Removal from Aqueous Solution Using Alum and Aluminum Hydroxide," Journal of Colloid and Interface Science 2007 315:70-79.
Guaya, et al., "Simultaneous Phosphate and Ammonium Removal from Aqueous Solution by a Hydrated Aluminum Oxide Modified Natural Zeolite," Chemical Engineering Journal (2015) 271:204-213.
Xie, et al., "Removal and Recovery of Phosphate from Water by Activated Aluminum Oxide and Lanthanum Oxide," Powder Technology (2015) 269:351-357.
Xu, et al., "Dual Removal Process of Phosphate on Ca-Layered Double Hydroxide with Substitution of Fe for Al," J. Hazard. Toxic Radioact. Waste, (2014) 18(4): A4014001-8.
Novillo, et al., "Evaluation of Phosphate Removal Capacity of Mg/Al Layered Doubled Hydroxides from Aqueous Solutions," Fuel (2014) 138:72-79.
Zhang, et al., Self-Assembly of Needle-Like Layered Double Hydroxide (LDH) Nanocrystals on Hydrochar: Characterization and Phosphate Removal Ability, RSC Adv., (2014) 4, 28171.
Bucak, et al., "Protein Separations Using Colloidal Magnetic Nanoparticles," Biotechnol. Prog. (2003) 19:477-484.
Shen, et al., "Adsorption of Phosphate Onto Amine Functionalized Nano-Sized Magentic Polymer Adsorbents: Mechanism and Magnetic Effects," RSC Adv. (2015) 5: 22080-22090.
Wang, et al., "Adsorptive Removal of Phosphate by Magnetic $Fe_3O_4@C@ZrO_2$," Colloids and Surfaces A: Physiochem. Eng. Aspects (2015) 469:100-106.
Sarkar, et al., "Design of a New Nanostructure Comprising Mesoporous $ZrO_2$ Shell and Magnetite Core ($Fe_3O_4@mZrO_2$) and Study of its Phosphate Ion Separation Efficiency," J. Mater. Chem., (2010) 20:4417-4424.
Webb, "SIXpack: A Graphical User Interface for XAS Analysis Using IFEFFIT," Phys. Scr. (2005) 1011.
Ravel and Newville, "Athena, Artemis, Hephaestus: Data Analysis for X-ray Absorption Spectroscopy Using Ifeffit," J. of Synchrotron Rad. (2005) 12:537-541.
Okano and Nakamura, "Hydrothermal Synthesis of Aluminum Bearing Magnetite Particles," Colloids and Physicochemical and Engineering Aspects (1998) 139:279-285.
Kapelyushin, et al., "In-Situ Study of Gaseous Reduction of Magnetite Doped with Alumna Using High-Temperature XRD Analysis," Metallurgical and Materials Transactions B (2015) vol. 46B p. 2564.
Jia, et al., "One-Step Synthesis of $Fe_3O_4$ NanorodslGraphene Nanocomposites," Appl Phys A (2012) 109:261-265.
Latif, et al., "Low pH Anaerobic Digestion of Waste Activated Sludge for Enhanced Phosphorous Release," Water Research (2015) 81:288-293.
Toster, et al., "Superparamagnetic Imposed Diatom Frustules for the Effective Removal of Phosphates," Green Chem. (2014)16 p. 82.
Yan, et al., "Kinetic, Isotherm and Thermodynamic Investigations of Phosphate Adsorption onto Core-Shell $Fe_3O_4@LDHs$ composites with Easy Magnetic Separation Assistance," Journal of Colloid and Interface Science (2015) 448:508-516.
Yoon, et al., "Kinetic, Equilibrium and Thermodynamic Studies for Phosphate Adsorption to Magnetic Iron Oxide Nanoparticles," Chemical Engineering Journal (2014) 236:341-347.
Long, et al., "Removal of Phosphate from Aqueous Solution by Magentic Fe-Zr Binary Oxide," Chemical Engineering Journal (2011) 171:448-455.
Lin, et al., "Application of Magnetite Modified with Aluminum/Silica to Adsorb Phosphate in Aqueous Solution," J Chem Technol Biotechnol (2011) 86:1449-1456.
Lin, et al., "Application of Magnetite Modified with Polyacrylamide to Adsorb Phosphate in Aqueous Solution," Journal of the Taiwan Institute of chemical Engineers (2013) 44:45-51.
Jia, et al., "Effective Removal of Phosphate from Aqueous Solution Using Mesoporous Rodlike $NiFe_2O_r$ as Magnetically Separable Adsorbent," Colloids and Surfaces A: Physcochem. Eng. Aspects (2013) 436:495-503.
Ingall, et al., "Phosphorus K-Edge XANES Spectroscopy of Mineral Standards," Journal of Synchrotron Radiation (2011)18:189-197.
Pratesi, et al., "Santabarbaraite: A New Amorphous Phosphate Mineral," Eur. J. Mineral (2003) 15:185-192.
Hesterberg, et al., "XAFS Study of Adsorbed and Mineral Forms of Phosphate," J. Synchrotron Rad. (1999) 6:636:638.
Khare, et al. "XANES Investigation of Phosphate Sorption in Single and Binary Systems of Iron and Aluminum Oxide Minerals," Environ. Sci. Technol. (2005) 29:2152-2160.
Khare, et al., "XANES Determination of Adsorbed Phosphate Distribution Between Ferrihydrite and Boehmite in Mixtures," Soil Sci. Soc. Am. J. (2004) 68:460-469.
Abdala, et al., "Residence Time and pH Effects on the Bonding Configuration of Orthophosphate Surface Complexes at the Goethite/Water Interface as Examined by Extended X-ray Absorption Fine Structure (EXAFS) Spectroscopy," Journal of Colloid and Interface Science (2015) 442:15-21.
Liu and Hesterberg, "Phosphate Bonding on Noncrystalline Al/Fe-Hydroxide Coprecipitates," Environ. Sci. Technol. (2011) 45:6283-6289.
Batte, et al., "Biofilm Responses to Ageing and to a High Phosphate Load in a Bench-Scale Drinking Water System," Water Research (2003) 37:1351-1361.

\* cited by examiner

CONTAMINATE REMOVAL USING ALUMINUM-DOPED MAGNETIC NANOPARTICLES

CROSS-REFERENCE TO RELATED APPLICATIONS

This application claims the benefit of U.S. Provisional Patent Application Ser. No. 62/345,482, filed Jun. 3, 2016, entitled "Phosphate Removal Using Functionalized Magnetic Nanoparticles," the entire contents and substance of which are hereby incorporated by reference as if fully set forth below.

BACKGROUND

Limited supply of phosphorus (P) reserves and the increasing demand for food production have created a strong demand for P fertilizers. Global P depletion is one of the important challenges in the 21st century. However, runoff from fields and feedlots introduces large quantities of P-containing fertilizers and animal wastes into surface waters, causing water pollution and eutrophication. Such runoff is a danger for the denizen of water and the whole ecosystem on a broader prospective. Eutrophication caused by municipal and industrial wastewaters was reported even at low concentrations of P (less than 1 mg/L). In order to control algal growth, the U.S. EPA water quality criteria stated that phosphate should not exceed 0.05 mg/L for streams discharging into lakes or reservoirs, 0.025 mg/L within a lake or reservoir, and 0.1 mg/L for streams or flowing waters not discharging into lakes or reservoirs. Improved management strategies and treatment technologies are highly desired in order to reduce agricultural runoff and to capture and recycle P before it reaches waterbodies.

Many approaches have been developed to remove dissolved phosphate from wastewaters prior to their discharge into natural water bodies and runoff, including physical, chemical, and biological treatment methods. Typically, phosphate is separated from wastewaters by adding Al-, Fe-, or Ca-based coagulants and allowing the precipitates to settle out. A common drawback of this coagulation process is the high costs associated with the use of metal salts and the treatment of the remaining sludge.

The enhanced biological phosphorus removal (EBPR) process utilizes polyphosphate-accumulating organisms (PAO) to take up and polymerize inorganic phosphate to produce polyphosphate (polyP). P level of lower than 0.11 mg/L can be achieved in the effluents after the EBPR treatment of municipal wastewater. However, the performance of EBPR can be dramatically reduced due to many environmental and operating factors, making this process unstable. In addition, the inability to isolate the responsible microorganisms in EBPR and to verify their biochemical metabolism appeared to limit the development of a better understanding of the operating metabolic pathways and the characterization of the entire microbial ecology of the systems, thus hampering further improvement of the EBPR system.

Adsorption has attracted increasing interests for phosphate removal from wastewater due to the easiness of design and operation and no additional production of sludge. This method has also been considered as an effective approach for recycling P from wastewater effluents. Over the past decade, various adsorbents have been developed for phosphate removal from wastewaters including agricultural waste and by-products, anion-exchange resins, iron-oxide based adsorbents, aluminum-containing materials, and layered double hydroxides. However, additional filtration or centrifugation steps are likely needed for the separation of sorbents from aqueous solutions.

Magnetic nanomaterial based sorbents are very attractive due to their high surface area and facile solid-liquid separation under an applied magnetic field. Their surface areas per unit volume can be on the order of $5 \times 10^7$ $m^2/m^3$ for a 10% dispersion of 15-nm particles. Adsorption of phosphate onto amine functionalized magnetic nanoparticles through electrostatic attraction has been reported. However, the simple electrostatic adsorption might suffer from the interference of co-existing anions in wastewater. Core shell materials with $Fe_3O_4$ as the core (~600 nm diameter) and $ZrO_2$ as shell (~10 nm thickness) have also been used to remove phosphate, with adsorption capacities ranging from 8 to 39 mg P/g.

BRIEF SUMMARY

Embodiments of the present disclosure can include a method for isolating a contaminate from water comprising: introducing a plurality of aluminum-doped nanoparticles to water, the water comprising the contaminate; contacting the plurality of aluminum-doped nanoparticles with the contaminate to form contaminate-adsorbed nanoparticles; and isolating the contaminate-adsorbed nanoparticles by applying a magnetic field to the water. In some embodiments, the method can further comprise removing the plurality of contaminate-adsorbed nanoparticles from the water.

In some embodiments, the contaminate can comprise a phosphorus species, chemical oxygen demand, suspended solids, dissolved solids, a fat, an oil, a grease, or a combination thereof. In some embodiments, the phosphorus species is particulate phosphorous or soluble phosphorous. In other embodiments, the phosphorus species is an organophosphate, a polyphosphate, or a reactive phosphate.

In some embodiments, about 40% to about 97% of the contaminate can be removed from the water.

In some embodiments, the aluminum-doped nanoparticles can be synthesized from a mixture of ferric salt, ferrous salt, and aluminum salt with sodium hydroxide. In some embodiments, the aluminum-doped nanoparticles comprise 20 to 50% aluminum. In some embodiments, the plurality of aluminum-doped nanoparticles is characterized by a maximum adsorption capacity of about 102 mg/g.

In some embodiments, the method can further comprise regenerating the plurality of aluminum-doped nanoparticles. Regenerating the plurality of aluminum-doped nanoparticles can comprise contacting the contaminate-adsorbed nanoparticles with aluminum sulfate.

Embodiments of the present disclosure can also comprise a method for removing phosphorus species from wastewater comprising: introducing a plurality of aluminum-doped nanoparticles to wastewater including phosphorus species, the plurality of aluminum-doped nanoparticles configured to adsorb at least a portion of the phosphorous species to form a plurality of phosphorous adsorbed nanoparticles; removing the phosphorous-adsorbed nanoparticles by applying a magnetic field to the wastewater; and regenerating the plurality of nanoparticles by precipitating the phosphorous-adsorbed nanoparticles with a regeneration agent; wherein the plurality of aluminum-doped nanoparticles remove between about 80 and about 95% of the phosphorous from the wastewater.

Embodiments of the present disclosure can also include an aluminum-phosphorous magnetic nanoparticle produced by the process comprising: contacting an aluminum-doped magnetic nanoparticle with a phosphorous species mixture the exposing facilitating adsorption of the phosphate to a surface of the aluminum-doped magnetic nanoparticle; and isolating the aluminum-phosphorous nanoparticles by applying a magnetic field to the mixture.

DETAILED DESCRIPTION

Figure 1:
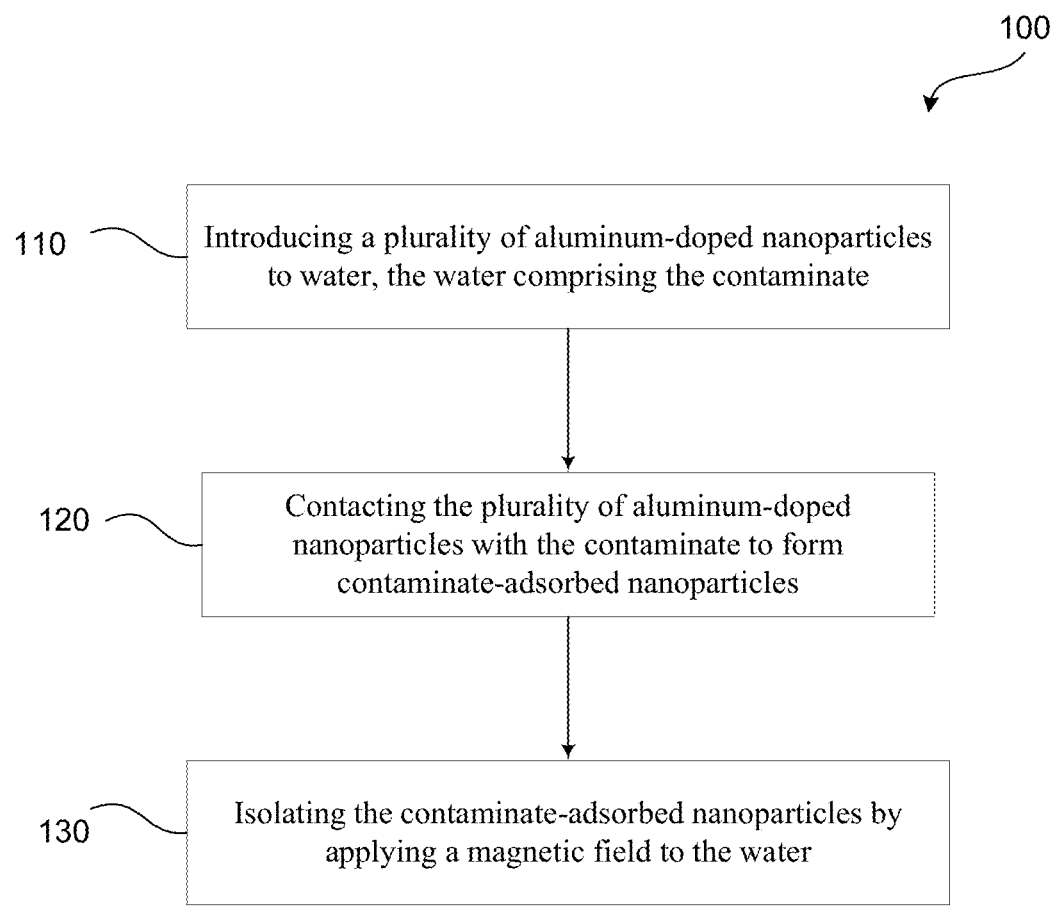
FIG. 1 illustrates an exemplary method 100 for contaminate removal using aluminum-doped nanoparticles (Al-MNPs), in accordance with one or more embodiments of the present disclosure.

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another embodiment includes from the one particular value and/or to the other particular value.

By "comprising" or "comprising" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed Al-MNPs are a unique and inexpensive sorbent for contaminate removal from water. Al-MNPs are advantageous for removing contaminates from water because Al-MNPs have large surface areas for adsorption, do not create by-product sludge, do not require chemicals, are easily separated, and are low-cost and sustainable. Additionally, Al-MNPs can provide fast and efficient P removal from meat-processing wastewater, such as poultry wastewater, and the like.

FIG. 1 illustrates an exemplary method 100 for contaminate removal using Al-MNPs. As illustrated at FIG. 1, a method 100 for contaminate removal can comprise introducing a plurality of Al-MNPs to water 110, the water comprising the contaminate; contacting the plurality of Al-MNPs with the contaminate to form contaminate-adsorbed nanoparticles 120; and isolating the contaminate-adsorbed nanoparticles by applying a magnetic field to the water 130. In some embodiments, the contaminate-adsorbed nanoparticles can be removed from the water. Additionally, in some embodiments, at least a portion of the plurality of Al-MNPs can be regenerated and reused in further methods for contaminate removal.

In some embodiments, the contaminate can be a phosphrous species. For instance, phosphorous species can include but is not limited to organophosphates, reactive phosphates, or polyphosphates. Organophosphorous can include phosphorous species derived from biological matter including but not limited to DNA, RNA, and bacteria. Reactive phosphorus can include inorganic orthophosphates. Polyphosphates are condensed phosphates including pyro, meta and polyphosphate.

In some embodiments, the phosphorous species can include both particulate and soluable phosphates. For instance, the phosphorous species may be total acid hydrolysable phosphorous, total reactive phosphrous, or total organic phosophorous. In other embodiments, the phosphorous species can include soluble phosphates. For instance, the phosphates may be soluble reactive phosphorous, soluble acid-hydrolysable phosphorous, or soluble organic phosphorous.

In other embodiments, the contaminates can comprise biochemical oxygen demand, chemical oxygen demand, total suspended solids, total Kjeldahl nitrogen, fat, oil, grease, and total dissolved solids. In an embodiment, the wastewater can comprise one or more contaminates. In an embodiment, the contaminate can be selected from the group consisting of biochemical oxygen demand, chemical oxygen demand, a suspended solid, total Kjeldahl nitrogen, a fat, an oil, a grease, and a dissolved solid.

Chemical oxygen demand (COD) can include a measure of the capacity of water to consume oxygen during the decomposition of organic matter and the oxidation of inorganic chemicals. COD can be measured by any method known in the art including the introduction of a digestion reagent to water and detecting the amount of chemical oxygen demand reagent remaining in the water.

Biochemical oxygen demand (BOD) can include a measure of the amount of dissolved oxygen that is present in water in order for microorganisms to decompose the organic matter in water. BOD can be measured by any method known in the art including dilution methods and manometric methods. In embodiments where BOD is measured using a dilution method, dissolved oxygen concentrations can be measured before and after incubation.

Total Kjeldahl nitrogen (TKN) can include a measure of the total concentration of organic nitrogen in water. In some embodiments, TKN can be oxidizing inorganic and organic nitrogen by digestion with peroxodisulfate and calculating the difference in nitrate before and after the digestion.

Total suspended solids (TSS) can include solids in water that can be trapped by a filter. TSS can be measured by filtering a volume of water and measuring the weight of the residue on the filter after trying. Total dissolved solids (TDS) can include inorganic salts and small amounts of organic matter that are dissolved in water. TDS can be measured by filtering a volume of water, evaporating the filtrate, and weighing the remaining residue.

Fats, oils, and grease (or FOG) can be measured gravimetrically by extracting a water sample with multiple aliquots of hexane followed by the evaporation of all of the solvent.

In some embodiments, the Al-NMPs can remove each type of contaminate present in the water. In some embodiments, the Al-NMPs can remove at least one type of contaminate present in the water. As such, in some embodiments, the water can be wastewater including wastewater from a meat processing plant, industrial wastewater, municipal wastewater, and field and feedlot wastewater.

The described Al-MNPs can be configured to remove a variety of contaminates from water. Additionally, the Al-MNPs can be configured to remove the contaminates in varying amounts. In some embodiments, about 40% to about 97% of the contaminate can be removed from the water. In some embodiments about 45% to about 97%, about 50% to about 97%, about 55% to about 97%, about 60% to about 97%, about 65% to about 97%, about 70% to about 97%, about 75% to about 97%, about 80% to about 97%, about 80% to about 95%, about 85% to about 97%, about 90% to about 97%, and about 95% to about 97% of the contaminate can be removed. In some embodiments, up to about 99% of contaminate can be removed. The amount of contaminate removed from the water as described herein can be amount of total contaminates removed from the water. Alternatively, the amount of contaminate removed from the water as described herein can be the amount of an individual contaminate removed from the water.

The Al-MNPs can be synthesized by a variety of methods. In some embodiments, the Al-MNPs can be synthesized from a solution of ferrous chloride ($FeCl_2$), ferric chloride ($FeCl_3$), and aluminum sulfate ($Al_2(SO_4)_3$) in deionized water. The solution can then be heated to about 80° C. with NaOH for 10 minutes. In other embodiments, a solution of $FeCl_2$, $FeCl_3$, and $Al_2(SO_4)_3$ in deionized water can be heated to about 90° C. Following, $NH_4OH$ can be added, and the mixture can be refluxed for about two hours.

The Al-MNPs can comprise varying amounts of aluminum. For instance in some embodiments, the Al-MNPs can comprise about 10% to about 50% aluminum, about 20% to about 50% aluminum, about 20% to about 40% aluminum, about 20% to about 30% aluminum, about 20% to about 25% aluminum. In some embodiments, the Al-MNPs can comprise about 10%, about 15%, about 20%, about 25%, about 30%, about 33%, about 35%, about 40%, about 45%, and about 50% aluminum. In some embodiments the Al-MNPs can comprise less than about 50% aluminum, less than about 40% aluminum, less than about 30% aluminum, less than about 20% aluminum, and less than about 10% aluminum.

When the Al-MNPs are introduced to the water containing the contaminate, the Al-MNPs can contact the contaminate to form contaminate-adsorbed nanoparticles. In other words, the contaminate can adsorb to the surface of the Al-MNPs. The described methods are advantageous as they not only reduce the costs of removing contaminates from water but also because they show significantly improved adsorption capacity. For instance, in embodiments for removal of phosphates, the described Al-MNPs can be characterized by a maximum adsorption capacity of about 588 mg/g. In some embodiments, the adsorption capacity of the Al-MNPs can be about 100 to about 600 mg/g, about 200 to about 600 mg/g, about 300 to about 600 mg/g, about 400 to about 600 mg/g, about 500 to about 600 mg/g, 50 to about 105 mg/g, about 50 to about 135 mg/g, about 50 to about 135 mg/g, about 50 to about 75 mg/g, about 50 to about 60 mg/g, about 75 to about 135 mg/g, about 80 to about 135 mg/g, about 90 to about 105 mg/g, and about 100 to about 135 mg/g, 110 to about 135 mg/g, 115 to about 135 mg/g, about 120 to about 135 mg/g, about 130 to about 135 mg/g. The adsorption capacity of the Al-MNPs can be less than about 600 mg/g, less than about 588 mg/g, less than about 550 mg/g, less than about 500 mg/g, less than about 400 mg/g, less than about 300 mg/g, less than about 200 mg/g, less than about 150 mg/g, less than about 132 mg/g, less than about 105 mg/g, less than about 100 mg/g, less than about 90 mg/g, less than about 80 mg/g, less than about 70 mg/g, and less than about 60 mg/g. In some embodiments, the adsorption capacity of the Al-MNPs can be about 50 mg/g, about 60 mg/g, about 70 mg/g, about 80 mg/g, about 90 mg/g, about 100 mg/g, about 101 mg/g, about 102 mg/g, about 103 mg/g, about 132 mg/g, about 200 mg/g, about 300 mg/g, about 400 mg/g about 500 mg/g, about 588 mg/g.

The Al-MNPs can be magnetized such that after adsorption of the contaminate the nanoparticles can be isolated by applying a magnetic field to the water. The amount of magnetization can depend on the strength of the magnetic field applied to the water. Those skilled in the art will understand that any type of magnet can be used for isolating Al-MNPs from the water. For instance, in some embodiments the magnet can be a permanent magnet. In other embodiments, the magnet can be an electromagnet.

One benefit of the present disclosure is the ability to easily regenerate the plurality of Al-MNPs from the contaminate-adsorbed nanoparticles after they are removed from the wastewater. In some embodiments regenerating the plurality of nanoparticles can comprise contacting the contaminate-adsorbed nanoparticles with a regeneration agent. In some embodiments the regeneration agent can be aluminum sulfate. The regeneration agent can react with the contaminate-adsorbed Al-MNPs wherein the regeneration agent selectively and/or competitively couples to the contaminate to form a contaminate-coupled regeneration agent and a contaminate-free Al-MNP thus regenerating the Al-MNP. The contaminate-coupled regeneration agent can then precipitate out of solution for use in other processes, such as fertilizers, and the like.

Another embodiment of the present disclosure can comprise an aluminum-phosphate magnetic nanoparticle produced by the process comprising: contacting an aluminum-doped magnetic nanoparticle with a phosphate mixture the exposing facilitating adsorption of the phosphate to a surface of the aluminum-doped magnetic nanoparticle; and isolating the aluminum-phosphate nanoparticles by applying a magnetic field to the mixture. The process for producing the aluminum-phosphate magnetic nanoparticle can include some or all of the features described above.

EXAMPLES

Example 1

Methods
  Chemicals and Materials
  Materials: Ammonium hydroxide ($NH_3OH$), ferrous chloride ($FeCl_2$), ferric chloride ($FeCl_3$), hydrochloric acid (HCl), nitric acid ($HNO_3$), aluminum sulfate ($Al_2(SO_4)_3$), monopotassium phosphate ($KH_2PO_4$), sodium chloride (NaCl), sodium nitrate ($NaNO_3$), sodium sulfate ($Na_2SO_4$), and sodium hydroxide (NaOH) were obtained from Sigma Aldrich (St Louis, Mo., USA) and used as received. ICP standards for Fe, Al, and P were purchased from High-Purity Standards (Charleston, S.C., USA). Poultry rinsing wastewater was obtained by rinsing a whole bird carcass, purchased at a local grocery store, in 400 ml of DI water. Wastewater samples after primary and secondary treatment were collected from local municipal wastewater treatment plants.
  Synthesis and Characterization
  Preparation of aluminum-doped magnetic nanoparticles: A diluted $NH_3OH$ solution at pH 12 was purged with argon and heated to 90° C. for 1 h. Then, a stoichiometric mixture of $FeCl_2/FeCl_3/Al_2(SO_4)_3$ was added drop-wise into the ammonium solution. The mixture was refluxed for 2 h with argon purging. The system was then cooled to room temperature, and the black precipitates at the bottom of flask were collected with a magnet (DynaMag-50, Life Technology) and washed three times with DI water. The final product was re-suspended in DI water for storage.

Material characterization: X-ray diffraction (XRD) data was collected with a Bruker D8 Advanced X-Ray Diffractometer with a copper Kα source over a 15-85° 2θ range. Magnetic measurements were performed using a Quantum Design MPMS-5S SQUID magnetometer. Particles were immobilized in icosane ($C_{20}H_{42}$, Aldrich) for hysteresis measurements. High resolution scanning transmission electron microcopy imaging and elemental mapping were conducted on Hitachi HD-2700 with Oxford XMax EDX detector. Scanning electron microscopy (SEM) imaging and elemental mapping were performed on Hitachi 8230 equipped with Oxford XMax EDX detector. The composition of the Al-MNP was also determined by inductively coupled plasma—optical emission spectrometry (ICP-OES). For this procedure, a known amount of nanoparticles was digested by concentrated $HNO_3$ in a Parr bomb at 200° C. for 2 h. Serial dilutions were performed in 2% $HNO_3$. Elemental analysis for Fe, Al, and P was performed on Perkin Elmer Optima 8000 ICP-OES. P levels in water samples were also measured by ICP-OES.

Synchrotron X-ray Absorption Spectroscopy (XAS) Analysis: Synchrotron-based X-ray absorption near edge structure (XANES) analysis was conducted at P K-edges to investigate the local coordination environment of P during phosphate sorption onto the pure and Al-doped MNP. XANES spectra were also collected on two reference compounds $AlPO_4$ (VWR) and $FePO_4$ (Aldrich). Phosphate sorption samples were obtained by reacting 3 mg of pure or Al-MNP with 30 mL of 30 ppm phosphate solution under constant shaking conditions for 2 h. At the end of reaction, an external magnet was used to separate the adsorbent from the liquid phase, followed by DI rinse (three times). The wet pastes were stored at −20° C. and only thawed before XAS data collection. Data collection was conducted in fluorescence mode at beamline 14-3 at the Stanford Synchrotron Radiation Light source (SSRL), Menlo Park, Calif. Reference samples were grounded into fine powders and brushed evenly onto P-free Kapton tapes. Excess powders were blown off to achieve a homogeneous thin film. For phosphate sorption samples, a thin layer of the thawed wet paste were directly mounted onto Kapton tapes and covered by a layer of 3 mm polypropylene film to avoid evaporation. The sample-loaded tapes were then mounted to a sample holder. The sample chamber was maintained under a He atmosphere at room temperature, and the spectra were collected in fluorescence mode using a PIPS detector. Energy calibration used $AlPO_4$ by setting the edge position (peak maxima of the first derivative) to be 2152.8 eV. Spectra for this reference sample were periodically collected to monitor possible energy shifting, which was not observed during data collection. XANES spectra were collected at energy ranges from 2100 to 2485 eV. Multiple scans were collected for each sample averaged, and normalized for further analysis. Data analysis was performed using the software SIXPack and Ifeffit.

Phosphate Adsorption Experiments
Adsorption Isothermal experiment: A phosphate stock solution with a concentration of 1000 ppm was prepared by dissolving $KH_2PO_4$ in DI water. A volume of 30 mL of phosphate with concentrations ranging from 1 to 40 ppm was prepared in DI water in a 50 mL centrifuge tube. Then, 5 mL of the solution were taken out as a positive control for P level measurement. 3 and 6 mg of Al-MNP, respectively, were added into the phosphate solutions and shaken on a wrist shaker overnight. Then, an external magnet was used to separate the adsorbent from the liquid phase. The supernatant was collected and the concentration of P in supernatant was measured by ICP-OES. The adsorption capacity of phosphate by Al-MNP can be expressed as follows:

$$q_e = (C_0 - C_e)\frac{V}{m} \quad \text{Equation 1}$$

where $q_e$ is the adsorption capacity at equilibrium (mg/g), $C_0$ is initial concentration of solution (mg/L), $C_e$ is the concentration at the adsorption equilibrium (mg/L), V is the volume of water sample (L), and m is the mass of the sorbent (g). Both Langmuir and Freundlich models were tested for fitting the sorption isotherms. The Langmuir equation is expressed as:

$$\frac{C_e}{q_e} = \frac{1}{q_m}C_e + \frac{1}{K_L q_m} \quad \text{Equation 2}$$

where $q_m$ is the maximum adsorption capacity (mg/g), and $K_L$ is the Langmuir adsorption constant (L/mg). If the adsorption system followed a Langmuir adsorption model, then a plot of $C_e/q_e$ versus $C_e$ would produce a straight line from which the constants $q_m$ and $K_L$ could be evaluated.

The Freundlich adsorption isotherm is represented by the following equation:

$$\ln q_e = \ln K_F + \frac{1}{n}\ln C_e \quad \text{Equation 3}$$

where $K_F$ is a Freundlich constant in $(mg/g)(L/mg)^{1/n}$, and n is a Freundlich constant representing the adsorption intensity. If the adsorption system followed the Freundlich model, then a plot of $\ln q_e$ versus $\ln C_e$ would give a straight line from which constants $K_F$ and n could be evaluated.

Phosphate removal studies: Phosphate removal experiments were performed in 10 mL of 10 ppm phosphate solutions with 0.1 M $NaNO_3$ as background electrolyte. 3 mg of Al-MNP was added into the phosphate solution and mixed for 30 min using a wrist shaker. Then, a magnet was used to attract the particles to the side of the tube, and the supernatant was collected for ICP analysis. For experiments involving variable pH, the pH values were adjusted by adding diluted $HNO_3$ or NaOH. Phosphate removal efficiency at time t was calculated as:

$$\% \text{ removal} = \frac{C_0 - C_t}{C_0} \times 100\% \quad \text{Equation 4}$$

Dopant LeachingTtest

To determine whether metals from the nanoparticles were leached back into solution, 3 mg of Al-MNP was added into 10 mL of 10 ppm phosphate solution and the suspension was shaken for 30 min using a wrist shaker. The supernatant was collected after magnetic separation and analyzed for Al and Fe concentrations by ICP-OES.

Al-MNP Nanoparticle Regeneration

After conducting the Al-MNP in a typical phosphate removal experiment, phosphate-loaded Al-MNPs were soaked in 0.05 M $Al_2(SO_4)_3$ for 5 minutes. The supernatant and regenerated Al-MNPs were magnetically separated, followed by 2 times of rinsing with 0.1 M $NaNO_3$.

Results and Discussion

Characterization of Pure and Al-MNPs

Figure 2:
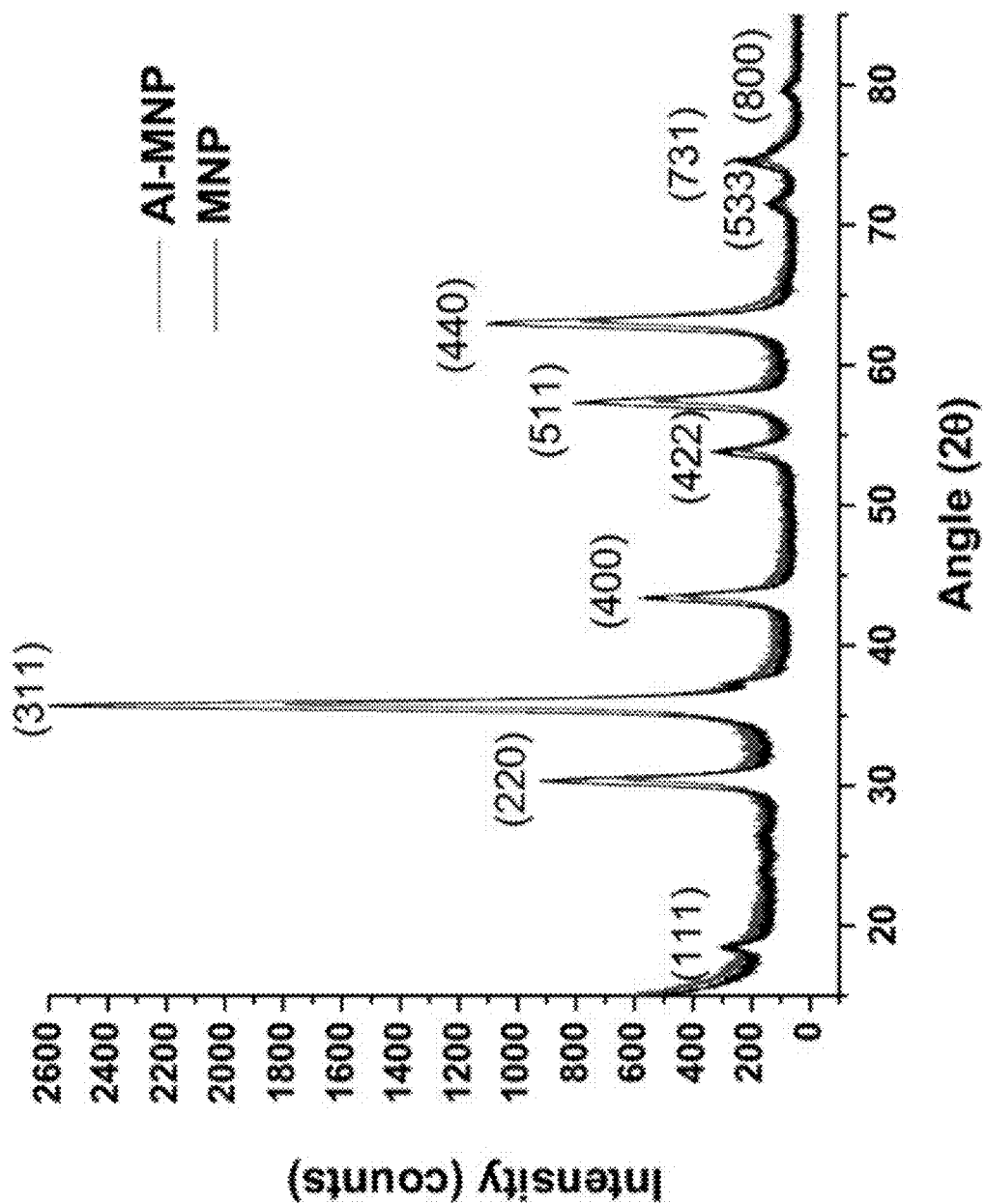
FIG. 2 shows X-ray diffraction patterns of pure and Al-doped magnetite, in accordance with one or more embodiments of the present disclosure.
Figure 3:
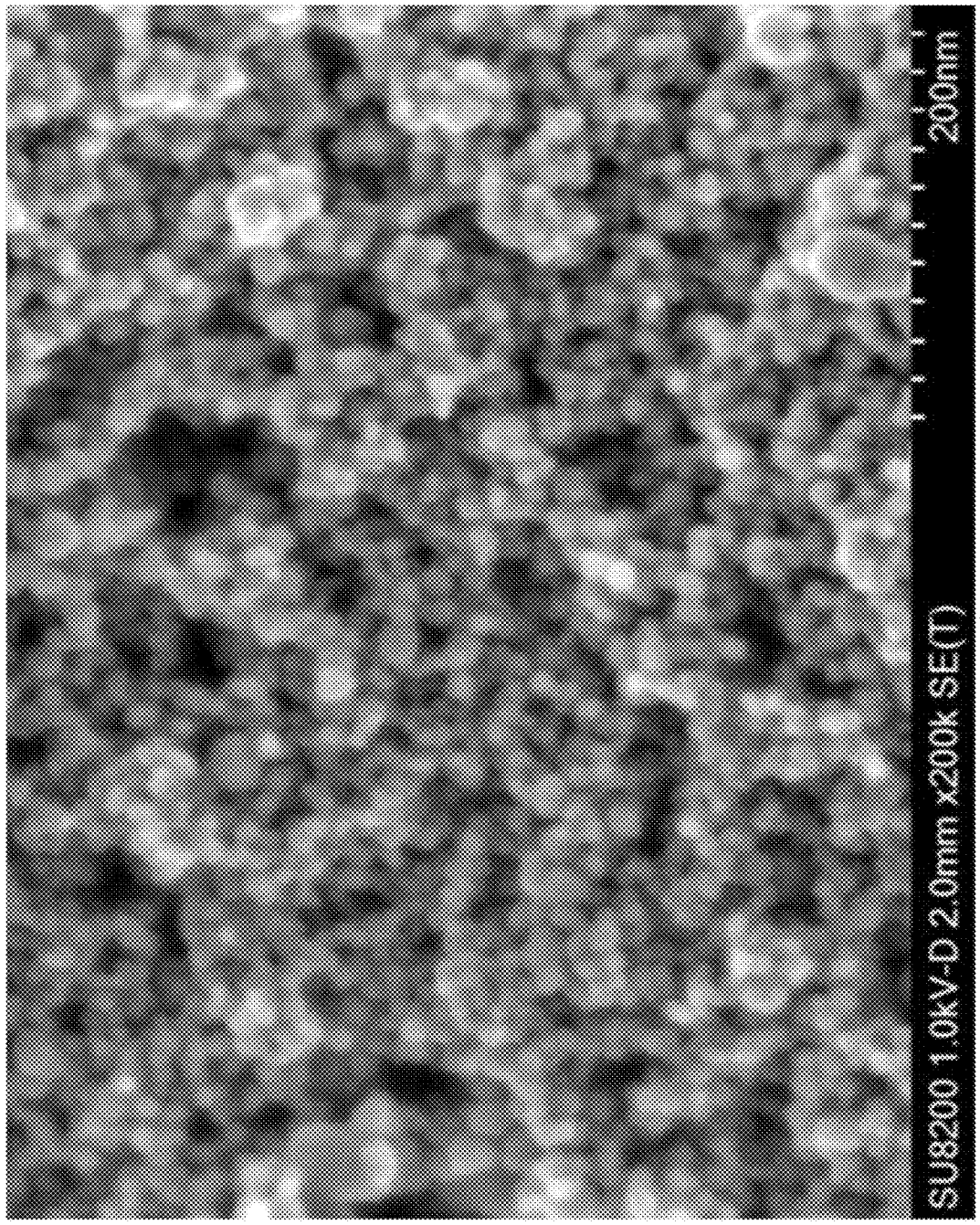
FIG. 3 is an SEM picture of prepared Al-MNPs, in accordance with one or more embodiments of the present disclosure.

The X-ray diffraction patterns of both pure and Al-doped magnetite ($Fe_3O_4$) magnetic nanoparticles are shown in FIG. 2. The peaks centered at 2θ=31°, 36°, 44°, 58° and 63° can be indexed as the (220), (311), (400), (511) and (440) planes of magnetite, in agreement with the standard magnetite JCPDS card (card no. 19-0629). However, slight peak shifts were observed for Al-MNP. Rietveld refinement was performed to extract the lattice constant and averaged crystallite size, and the results indicated that the lattice constant was reduced from 8.358 Å in pure MNP to 8.334 Å in Al-MNP and the grain size was also reduced from 14.24 nm in pure MNP to 9.88 nm in Al-MNP. The size of the prepared Al-MNP was confirmed to be around 10 nm, as shown in the SEM picture in FIG. 3.

Synthesis of magnetite in the presence of Al was previously reported to produce $Fe_3O_4$—$FeAl_2O_4$ solid solution. The lattice constant of the doped $Fe_3O_4$—$FeAl_2O_4$ solid solution as a function of $FeAl_2O_4$ concentration X (mol %) at room temperature was described by the following Vegard's equation:

$$L_d(\text{Å})=8.391-0.00190X-0.5X^2\times10^{-5} \quad \text{Equation 5}$$

Figure 4:
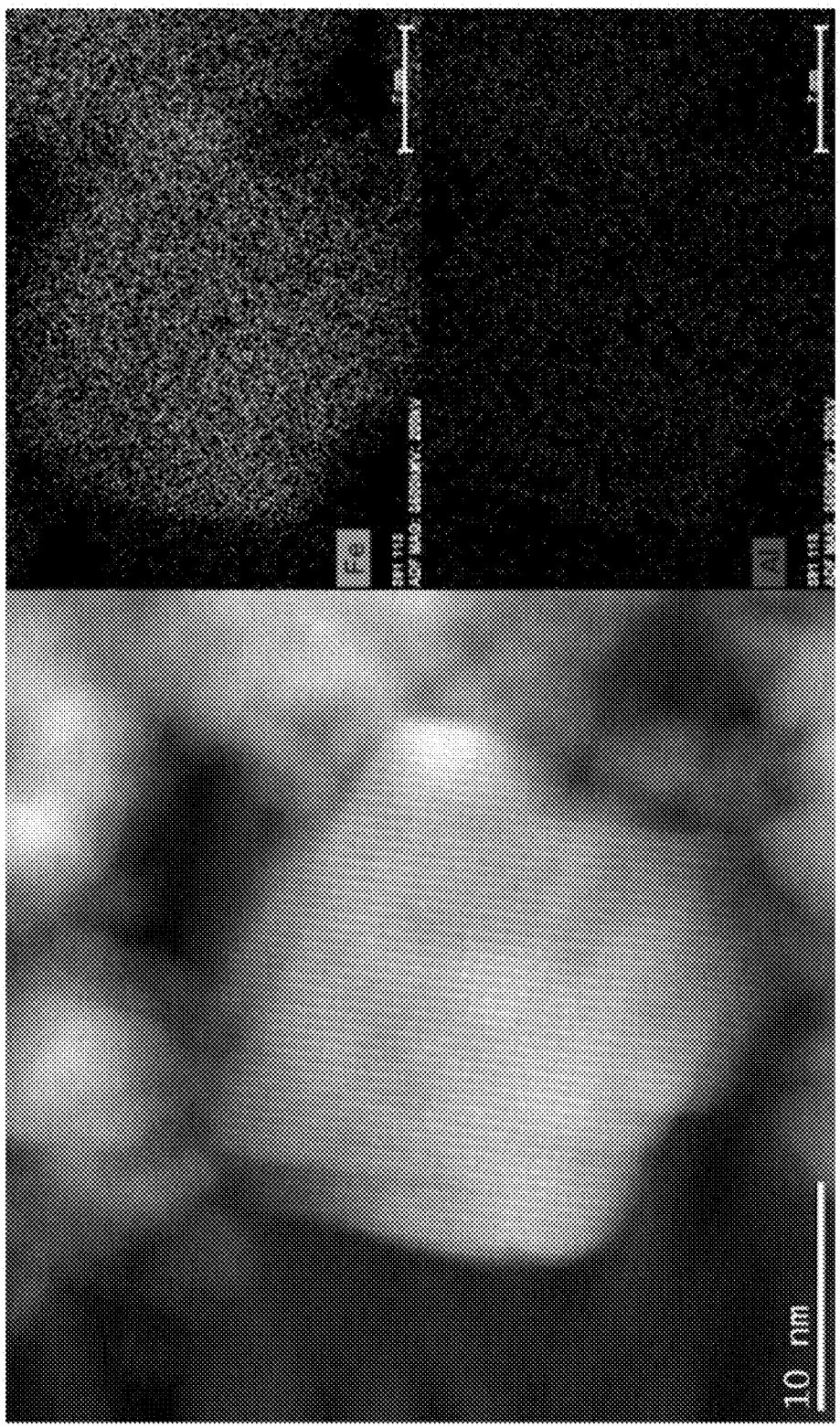
FIG. 4 is a high-resolution transmission electron microscopic photograph of an Al-MNP particle (left) and EDX mapping of Fe and Al distribution on the particle (left), in accordance with one or more embodiments of the present disclosure.

The 8.334 Å lattice constant of the Al-MNP corresponded to 30% of $FeAl_2O_4$ in the solid solution. SEM-EDX and ICP-OES determined Al:Fe ratios were 0.30 and 0.31, respectively, corresponding to 34% of $FeAl_2O_4$ in the solid solution. The less amount of $FeAl_2O_4$ as determined by XRD might suggest that small amounts of Al ions remained as amorphous Al (oxy)hydroxide phase(s) in the doped nanoparticles. High resolution transmission electron microscopy (HRTEM) with energy dispersive spectroscopy (EDX) was employed to examine Al distribution in the obtained Al-MNP nanoparticles. As shown in FIG. 4, Al exhibited a uniform distribution as that of Fe, suggesting structural incorporation. The lattice fringe spacing between two adjacent crystal planes of the nanoparticle was 0.485 nm in the HRTEM image, corresponding to the (111) lattice plane of a single-phase $Fe_3O_4$.

Figure 5:
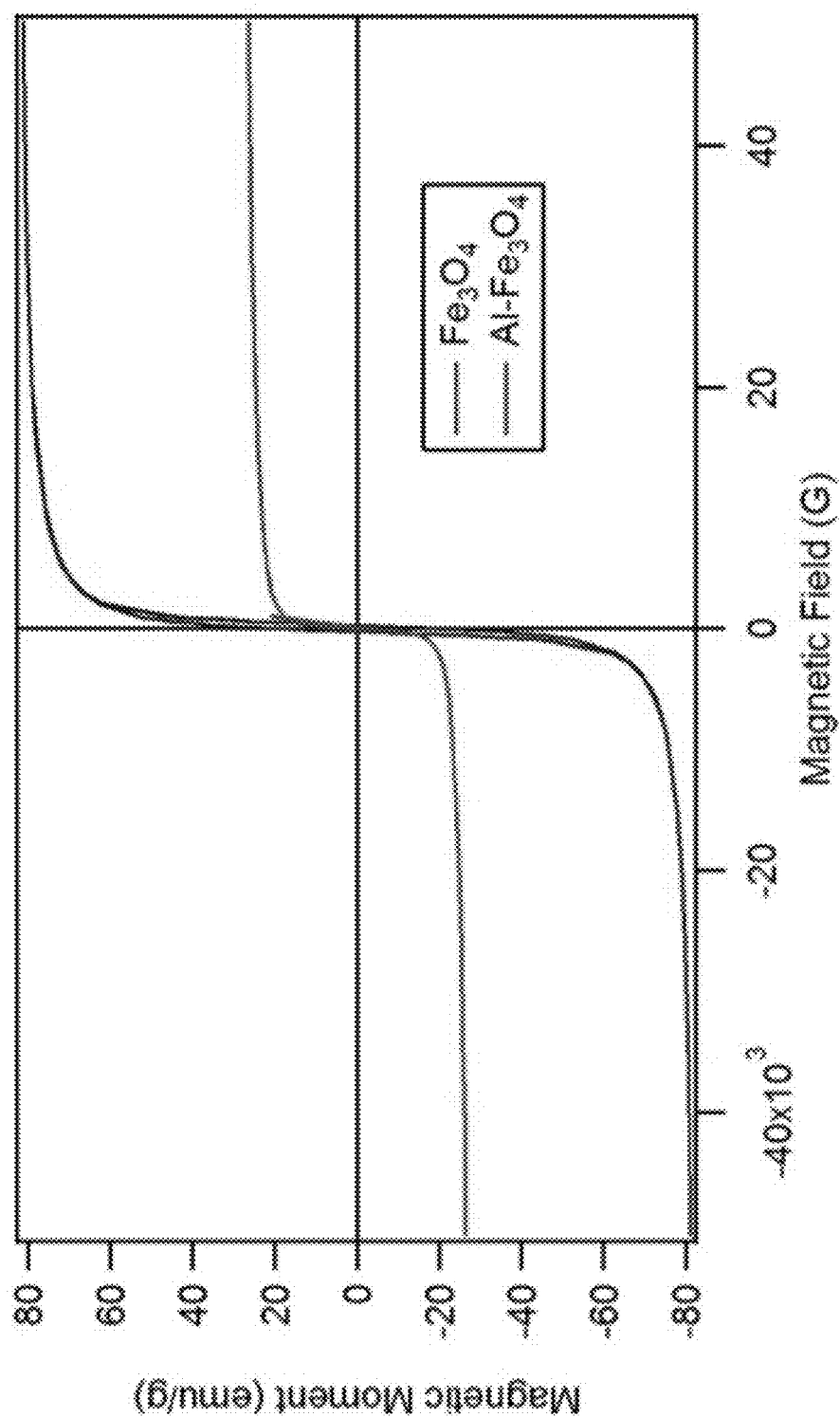
FIG. 5 shows magnetic moment measurements for pure and Al-doped MNPs, in accordance with one or more embodiments of the present disclosure.

The magnetic moments of both pure and Al-MNP were measured and compared as a function of applied magnetic field at a constant temperature of 300 K (FIG. 5). Both types of nanoparticles show superparamagnetism without hysteresis and remnant magnetization at room temperature. The saturation magnetization was found to be 77 emu/g for pure MNP and 26.3 emu/g for Al-MNP. The reduced magnetization for Al-MNP could be explained by the replacement of $Fe^{3+}$ by nonmagnetic $Al^{3+}$ in octahedral sites in a face-centered cubic lattice structure.

Adsorption Kinetic Studies

Figure 6:
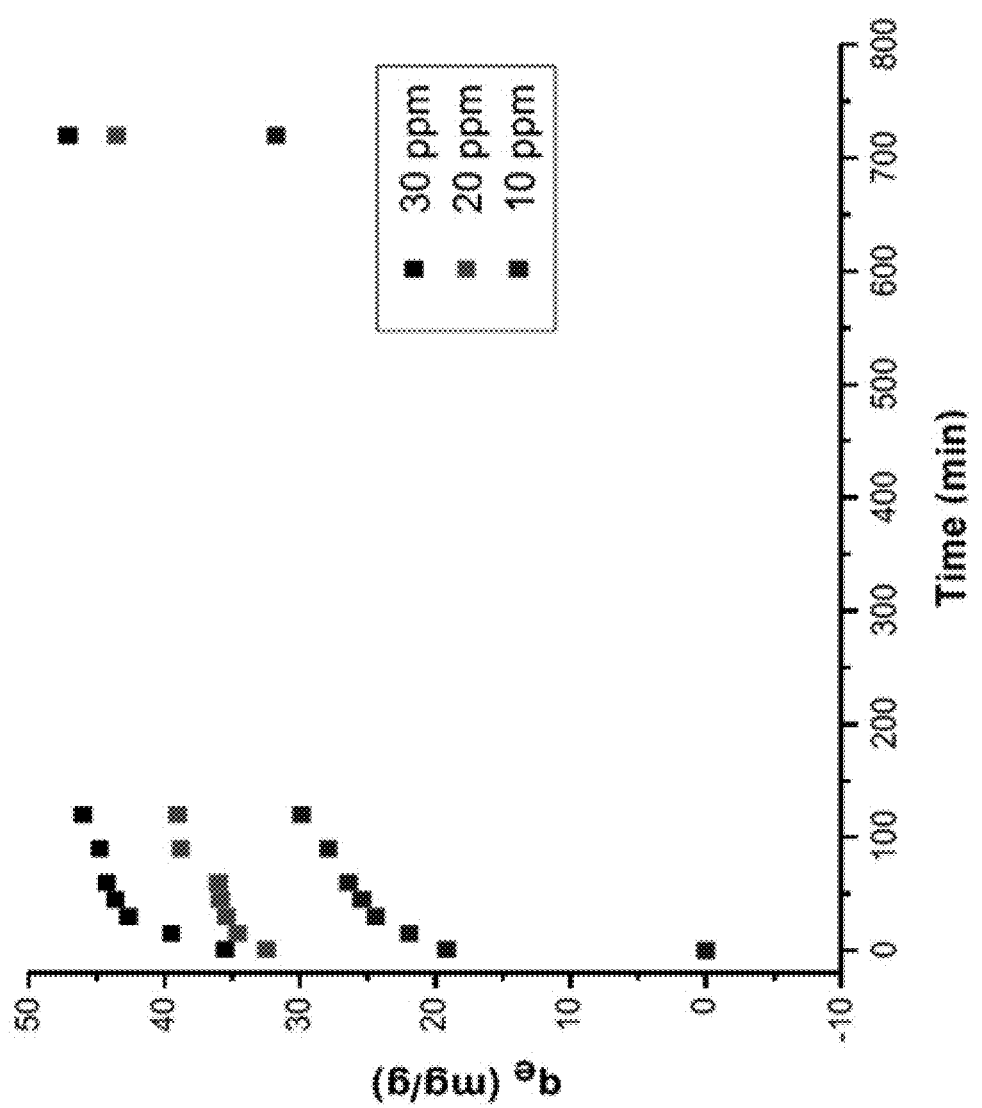
FIG. 6 illustrates the effect of contact time on phosphate removal, in accordance with one or more embodiments of the present disclosure.

To determine phosphate sorption kinetics, 3 mg of Al-MNP was mixed with 10 mL of phosphate at concentrations of 10, 20, and 30 ppm (typical municipal waste water contains 10 to 30 ppm phosphate), and phosphate uptake was measured at various time points (FIG. 6). The initial adsorption was fast, with ~75% of phosphate removed within the first 30 min, and greater than 90% of phosphate removal can be achieved in 2 h. The fast removal rate can be contributed to the high surface area of the MNP and the ease of dispersion into the liquid stream for better mixing with contaminants. Three well-known kinetic models, including the pseudo first order model, pseudo second order models, and the intraparticle diffusion model, were used to fit of the phosphate removal kinetic data. The pseudo first order model was given as:

$$\ln(q_e-q_t) = \ln g_e - k_1 t \qquad \text{Equation 6}$$

The pseudo second order kinetic model was given as:

$$\frac{t}{q_t} = \frac{1}{k_2 q_e^2} + \frac{1}{q_e} t \qquad \text{Equation 7}$$

The intraparticle diffusion kinetic model is given as:

$$q_t = k_d t^{\frac{1}{2}} + C \qquad \text{Equation 8}$$

where $q_t$ is the amount of phosphate removed at time t (mg/g), $q_e$ is the adsorption capacity at equilibrium (mg/g), $k_1$ is the pseudo first order rate constant (min$^{-1}$), $k_2$ is the pseudo second order rate constant (g/(mg·min)), $k_d$ is the intraparticle diffusion rate constant (mg/(g·min$^{0.5}$)), and t is the contact time (min). Plots of log($q_e - q_t$) versus t, $t/q_t$ versus t, and $q_t$ versus $t^{0.5}$ generated the rate constants, $q_e$ and the correlation coefficients $R^2$, which were compared in Table 1.

TABLE 1

Kinetic parameters for the adsorption of phosphates onto Al-MNP

| | | Initial phosphate concentrations (mg/L) | | |
|---|---|---|---|---|
| | | 10 | 20 | 30 |
| | | Experimental $q_e$ (mg/g) | | |
| | | 31.7 | 43.5 | 47.1 |
| Pseudo first-order model | $k_1$ (min$^{-1}$) | 0.015 | 0.007 | 0.018 |
| | $q_e$ (mg/g) | 12.52 | 10.59 | 9.49 |
| | $R^2$ | 0.972 | 0.93 | 0.94 |
| Pseudo second-order mode | $k_2$ (g/(mg·min)) | 0.177 | 0.0027 | 0.0065 |
| | $q_e$ (mg/g) | 30.3 | 43.86 | 47.62 |
| | $R^2$ | 0.992 | 0.999 | 0.999 |
| Intra-particle diffusion model | $k_d$ (mg/g·min$^{0.5}$) | 1.067 | 33.21 | 39.65 |
| | $R^2$ | 0.992 | 0.91 | 0.498 |

The most likely kinetic model for the adsorption of phosphate on Al-MNP was the pseudo second order model. Although the correlation coefficient for pseudo first order was greater than 0.9, there was a large difference between the experimental and theoretical adsorbed masses at equilibrium. This result indicated that the adsorption of phosphates onto Al-MNP was not an ideal pseudo first order reaction. The intraparticle diffusion model describes the adsorption processes where the rate of adsorption depends on the speed at which the adsorbate diffuses towards adsorbent. A better fit was obtained using this model at a low phosphate concentration, indicating some degree of diffusion-controlled step involved during the phosphate removal process at low phosphate levels. However, at higher phosphate concentrations, the rate limiting step became surface adsorption.

Figure 7:
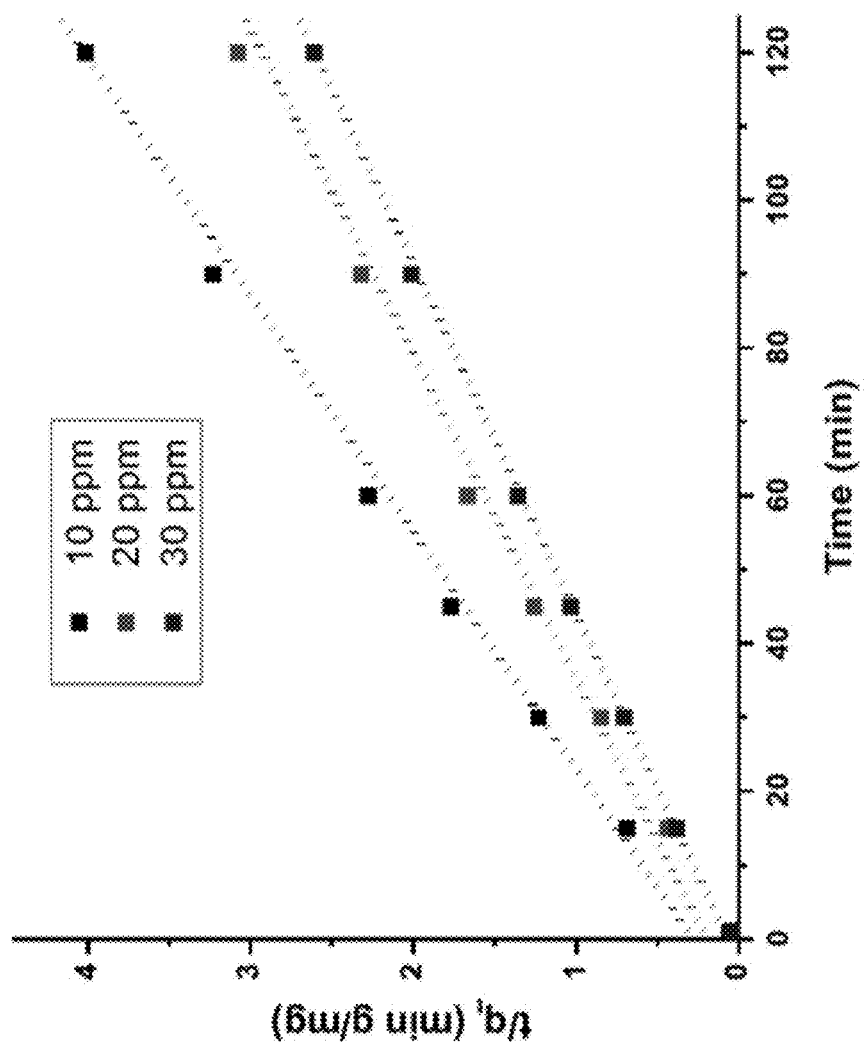
FIG. 7 illustrates pseudo second order fitting of phosphate removal data, in accordance with one or more embodiments of the present disclosure.

For the pseudo second order model, the correlation coefficients for all initial phosphate concentrations were higher than 0.99. In addition, the difference between the experimental and theoretical adsorbed masses at equilibrium was very small (less than 1%), indicating that the adsorption of phosphate on Al-MNP could be a pseudo second order reaction. In this model, the rate limiting step was the surface adsorption that involved chemisorption, where the phosphate removal from a solution was due to physicochemical interactions between the two phases. The pseudo second order model of phosphate removal was plotted as a function of time in FIG. 7.

pH Effects

Figure 8:
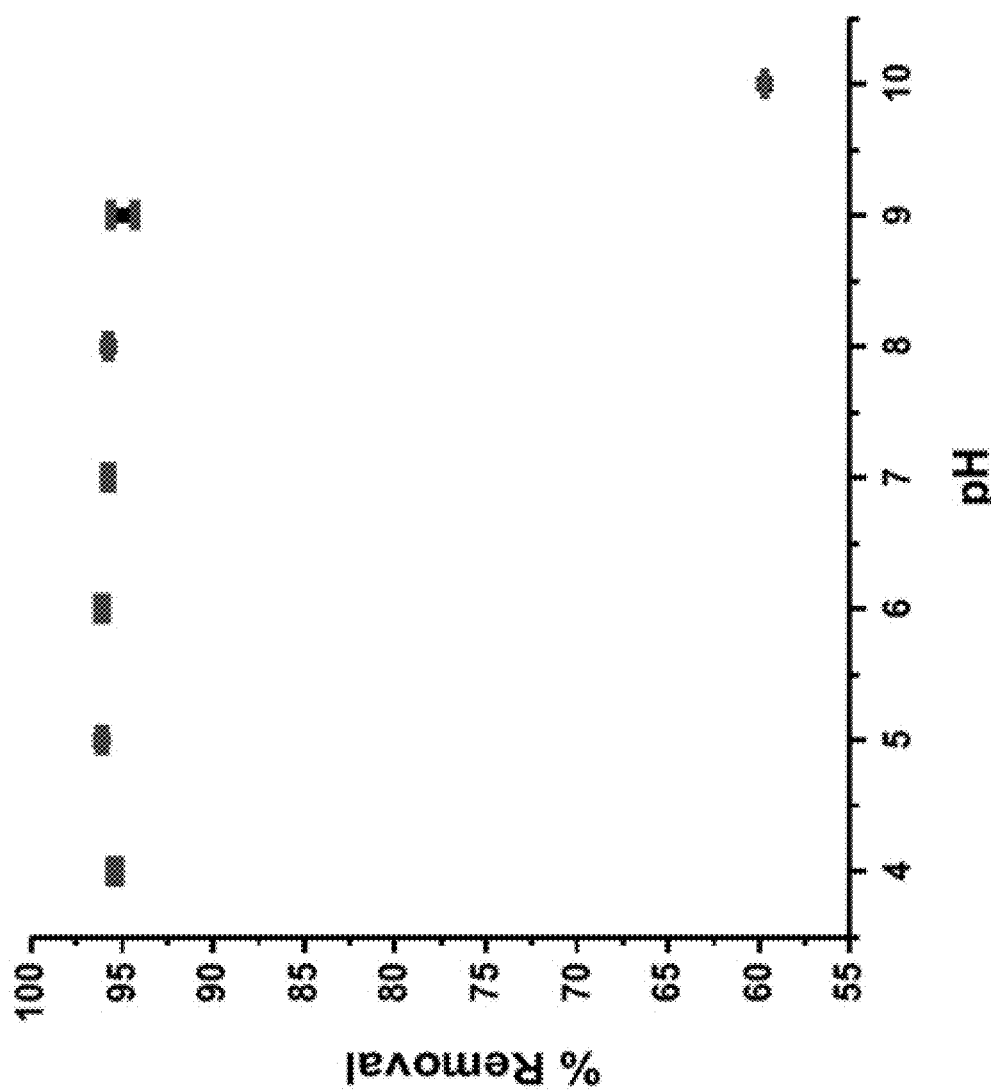
FIG. 8 illustrates the effect of pH on phosphate removal, in accordance with one or more embodiments of the present disclosure.

The effect of pH on phosphate removal was also examined (FIG. 8). These results showed that the removal efficiency was independent of the pH for pH 4 to 9. At pH 10, phosphate removal efficiency dropped from 95% to about 59%, likely due to the leaching of doped Al ions from Al-MNP as determined by ICP-OES analysis of the solution.

Adsorption Interference Studies

Figure 9:
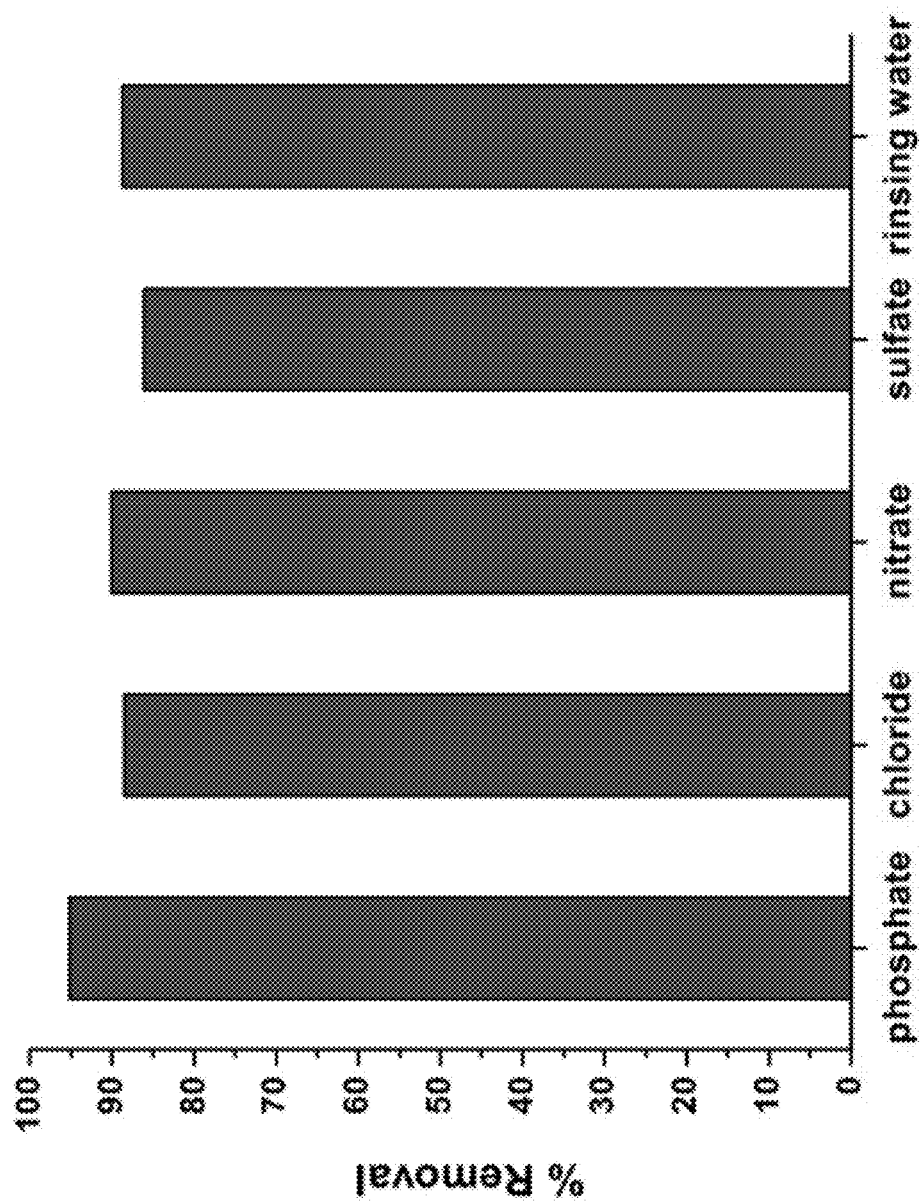
FIG. 9 illustrates the effect of co-existence of other anions on phosphate removal, in accordance with one or more embodiments of the present disclosure.

The potential influence of other common constituents in wastewaters on P removal by Al-MNP was also tested. Phosphate removal was assessed in the presence of 10 mg/L chloride (Cl$^-$), nitrate (NO$_3^-$), and sulfate (SO$_4^{2-}$). The effects of these coexisting anions on phosphate removal are shown in FIG. 9. Results showed that the presence of these anions only slightly reduced phosphate adsorption by 5 to 7%, suggesting that the Al-MNP was selective to phosphate adsorption. Poultry rinse water, which contained high level of organic matters, fat, and proteins, was also tested for phosphate removal. The phosphate level in the rinsing water was around 30 mg/L. The rinse water was filtered through a 1 μm syringe filter to prevent clogging during ICP measurements, and then diluted to have a final phosphate level of 10 ppm for direct comparison to the other experiments. The data can also be found in FIG. 9. All of the tests performed indicated that the presence of additional anions, as well as organic materials from poultry rinse, did not interfere with the phosphate removal efficacy.

Adsorption Isotherm Studies

The sorption isotherm was examined to understand how phosphate anions distribute themselves between liquid and solid phases at equilibrium. The most common adsorption models are the Langmuir model (corresponding to a monolayer of homogeneous adsorbent surface) and the Freundlich model (corresponding to a heterogeneous adsorbent surface). Table 2 summarized the parameters obtained from the curve fitting with two models. Clearly, the experimental data fit better with the Langmuir model of a monolayer homogeneous adsorbent surface, and the maximum adsorption capacity was greater than 100 mg/g. These results surpassed the commercially available adsorbents as mentioned in the literature and the reported magnetic adsorbents for phosphate, as shown in Table 3.

TABLE 2

Adsorption isotherm parameters with Langmuir and Freundlich models

| Amount of adsorbent | Langmuir model | | | | Freundlich model | | |
|---|---|---|---|---|---|---|---|
| | $q_m$ (mg/g) | $K_L$ (L/mg) | $R_L$ | $R^2$ | $K_F$ (mg/g) (L/mg)$^{1/n}$ | n | $R^2$ |
| 3 mg Al-MNP | 102.15 | 1.09 | 0.022 | 0.988 | 43.82 | 2.88 | 0.806 |
| 6 mg Al-MNP | 81.31 | 1.09 | 0.022 | 0.996 | 32.07 | 2.57 | 0.444 |

TABLE 3

Comparison of adsorption capacity of Al-MNP with other magnetic adsorbents

| Adsorbent | Maximum Adsorption Capacity (mg $PO_4$/g) |
|---|---|
| Diatom frustules coated on $Fe_3O_4$ | 4.89 |
| Core-shell $Fe_3O_4$ @ LDHs composite | 26.5-36.9 |
| Magnetic iron oxide nanoparticles | 5.03 |
| Fe—Zr binary oxide | 13.65 |
| Tetraethylenepentamine-coated $Fe_3O_4$ | 81-102 |
| Magnetite modified with aluminum/silica | 25.64 |
| Polyacrylamide coated $Fe_3O_4$ | 28.95 |
| $ZrO_2$ shell and magnetite core ($Fe_3O_4$@m$ZrO_2$) | 39.1 |
| Mesoporous rodlike $NiFe_2O_4$ | 39.3 |
| Al—$Fe_3O_4$ | 102.15 |

The increased adsorption capacity originated from the doped Al. The pure MNP had a much lower capacity for phosphate adsorption compared to Al-MNP. In addition, the treated Al-MNP at a higher pH lost its phosphate binding capability as a results of the loss of Al from the doped particle.

The Langmuir constant $K_L$ is related to the standard free energy of adsorption ($\Delta G°$) and indicates the phosphate binding affinity of the adsorbent. A high $K_L$ value indicates greater affinity for phosphate adsorption by an adsorbent. To determine whether the adsorption is favorable, the essential characteristics of the Langmuir equation can be expressed in a dimensionless separation factor or equilibrium parameter, $R_L$, as defined in Equation 8, where $C_0$ is the highest initial phosphate concentration (mg/L). The factor $R_L$ was within the range of 0 and 1.0, suggesting the favorability of phosphate adsorption onto the Al-MNP. In addition, the calculated n value in the Freundlich model was greater than 1, indicating a favorable adsorption.

$$R_L = \frac{1}{1 + K_L C_0} \quad \text{Equation 9}$$

Phosphate Uptake Mechanism

Figure 10:
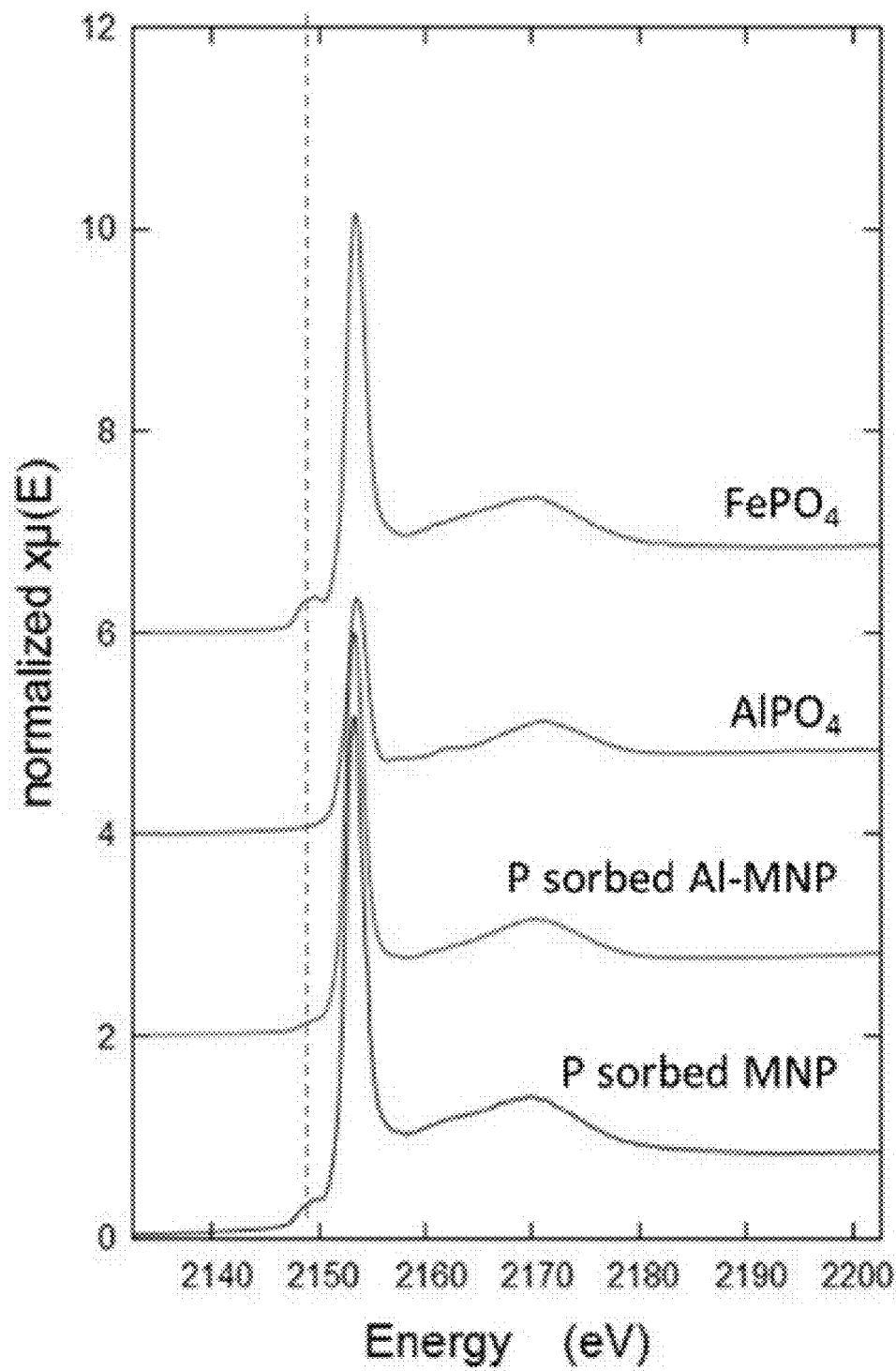
FIG. 10 shows the P K-edge XANES spectra of phosphate sorbed pure MNP and Al-MNP, as well as reference compounds $AlPO_4$ and $FePO_4$, in accordance with one or more embodiments of the present disclosure.

P K-edge XANES analysis was conducted to elucidate the mechanism(s) for the enhanced phosphate uptake on Al-MNPs as compared to pure MNPs. The XANES spectra of P sorbed MNP and $FePO_4$ both exhibit a unique pre-edge feature at ~2150 eV (dashed line in FIG. 10). The presence of this pre-edge peak has been previously observed for phosphate minerals containing Fe(III) species, such as heterosite and strengite. As a comparison, Al-containing phosphate minerals, such as $AlPO_4$ in the described system, does not have such pre-edge peak. Therefore, in a simple controlled system such as the described system, the presence and amplitude of this pre-edge peak can be used to identify the relative contribution of P—Fe association. Previous studies have demonstrated the formation of inner-sphere complexes (e.g. bond formation between phosphate tetrahedra and surface Fe atoms) during the sorption of phosphate onto Fe and Al oxide minerals. The intensity of the pre-edge feature can be correlated with the relative proportion of phosphate bonded with Al(III) versus Fe(III). Therefore, the much lower intensity of this pre-edge feature in the P sorbed Al-MNP sample suggests that large amount of phosphate was bonded to surface Al sites versus Fe sites.

Metal Leaching and Particle Regeneration

Doped Al was securely incorporated into the magnetite structure. Regular rinsing did not remove Al from the doped magnetic nanoparticles. This observation was confirmed by examining the metal levels in the liquid phase after phosphate removal. In a typical phosphate removal experiment, after 1 minute magnetic separation of the particles from the liquid phase, the supernatant only contained 15 ppb Al and 30 ppb Fe, meaning 99.94% of magnetic particles were separated from the liquid phase. The remaining Al and Fe in the treated water originated from the residual magnetic nanoparticles in the liquid phase.

Figure 11:
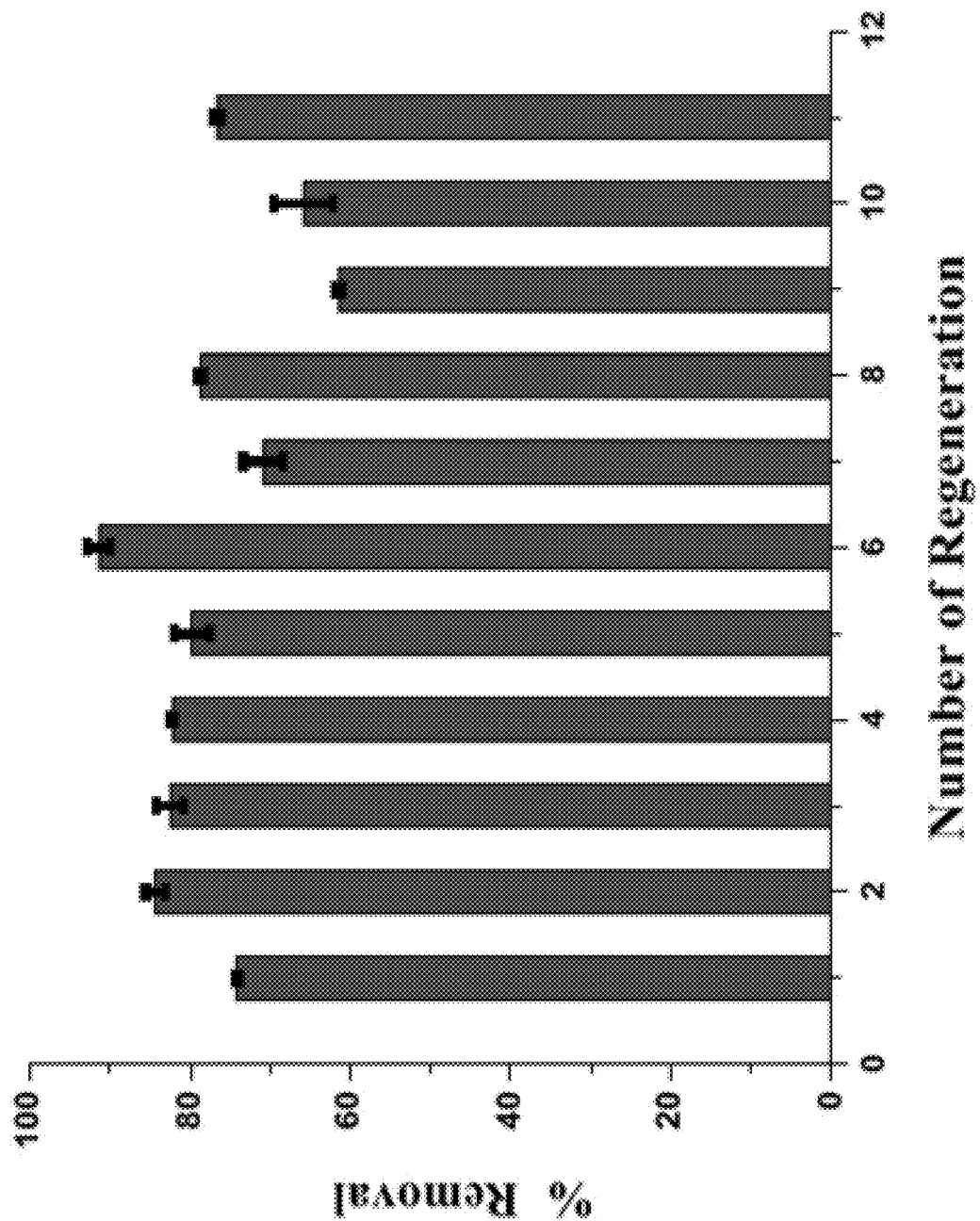
FIG. 11 illustrates percent phosphate removal with 3 mg of Al-MNP were regenerated and reused 11 times in 10 ml of water with 10 ppm of phosphate, in accordance with one or more embodiments of the present disclosure.

To lower the operation cost, the regeneration of Al-MNP was explored. It was discovered that phosphate adsorbed onto the Al-MNP can easily be stripped off through a competitive binding between the Al on the Al-MNP and Al in the solution. Using a 0.05M $Al^{3+}$ solution, the adsorbed phosphate was removed from the Al-MNP. The regenerated Al-MNP were then rinsed twice with 0.1 M $NaNO_3$ to remove any loosely attached Al on the particle before being used again for phosphate removal. FIG. 11 shows the regeneration capability of Al-MNP. It was clear that regenerated Al-MNP did not lose much phosphate binding capability after 11 cycles of regeneration.

Wastewater Treatment

The Al-MNPs were tested for phosphate removal on tap water, primary wastewater effluent, and secondary wastewater effluent. Without any additional pretreatment, these waters were directly treated with Al-MNP to examine the matrix effect on the phosphate removal efficacy. Table 4 summarizes the phosphate levels before and after the treatment. Due to the high phosphate concentration in the sample collected from primary effluent, 10 mg of Al-MNP was used; 3 mg was used for both tap water and secondary effluent water. Great phosphate reductions (above 80%) were obtained in all three water samples within 30 minutes. Although the phosphate level in the treated primary effluent sample was still high (2 ppm), either adding more adsorbents or performing a secondary Al-MNP treatment would reduce the phosphate level in the primary effluent to below 1 ppm. The phosphate level in tap water was greater than the secondary effluent because blended phosphates (1 to 5 ppm) are typically added to the drinking water as a corrosion inhibitor to prevent the leaching of lead and copper from pipes and fixtures.

TABLE 4

Phosphate removal in wastewater samples

| Sample type | Amount of adsorbent (mg) | Phosphate level before (ppm) | Phosphate level after (ppm) | Phosphate removal (%) |
|---|---|---|---|---|
| Tap water | 3 | 1.45 ± 0.02 | 0.262 ± 0.01 | 82% |
| Primary effluent | 10 | 26.4 ± 0.35 | 2.01 ± 0.03 | 92.3% |
| Secondary effluent | 3 | 0.95 ± 0.04 | 0.17 ± 0.002 | 82% |

Conclusion

A simple and low-cost method to remove phosphate from wastewater streams through the use of unique aluminum-doped magnetic nanoparticles were demonstrated. Aluminum-doped magnetic nanoparticles were synthesized using a co-precipitation method. Structure and composition analysis of the prepared magnetic nanoparticles indicated an inverse spinal structure with a composition of $FeAl_{0.75}Fe_{1.25}O_4$. These particles not only have a great adsorption capacity to phosphate. They also have an excellent selectivity for phosphate removal, even in the presence of other anions and organic materials such as fat and proteins. This property allows the particles to be used for a variety of wastewater treatments, as supported by the high levels of removal in poultry rinse water, tap water, and local municipal wastewater. Used Al-MNP can be regenerated for multiple cycles through a competitive binding chemistry by dispersing the particles in an aluminum sulfate solution. Therefore, the overall costs for phosphate removal are fairly low. Doped magnetic nanoparticles can be used as a promising adsorbent for phosphate removal in wastewaters.

Example 2

Methods

Chemicals and Materials

Materials: Ferrous chloride ($FeCl_2$), ferric chloride ($FeCl_3$), hydrochloric acid (HCl), nitric acid ($HNO_3$), aluminum sulfate ($Al_2(SO_4)_3$), monopotassium phosphate ($KH_2PO_4$), potassium antimonyl tartrate, ammonium molybdate, ascorbic acid, and sodium hydroxide (NaOH) were obtained from Sigma Aldrich (St Louis, Mo., USA) and used as received. ICP standards for Fe, Al, and P were purchased from High-Purity Standards (Charleston, S.C., USA).

MNP Synthesis and Characterization

Preparation of aluminum-doped magnetic nanoparticles: Al-MNP was prepared by first dissolving stoichiometric amounts of $Al_2(SO_4)_3$, $FeCl_3$, and $FeCl_2$ in 300 ml of deionized water. The solution was heated to 80° C., then 100 ml of 1.5 M NaOH were added and maintained at a temperature between 80-100° C. for ten minutes. A black precipitate was produced upon addition of NaOH. Finally, the cooled black suspension was placed on a magnetic separator (DynaMag-50, Life Technology) and washed five times with DI water. The final Al-MNP suspension was stored in DI water at room temperature.

Material characterization: X-ray diffraction (XRD) data was collected with a Bruker D8 Advanced X-Ray Diffractometer with a copper $K\alpha$ source over a 15-85° $2\theta$ range. Magnetic measurements were performed using a Quantum Design MPMS-5S SQUID magnetometer. Particles were immobilized in icosane ($C_{20}H_{42}$, Aldrich) for hysteresis measurements. The composition of the Al-MNP was determined by inductively coupled plasma—optical emission spectrometry (ICP-OES). For this procedure, a known amount of nanoparticles was digested by concentrated $HNO_3$ in a Parr bomb at 200° C. for two hours. Serial dilutions were performed in 2% $HNO_3$. Elemental analysis for Fe, Al, and P was performed on Perkin Elmer Optima 8000 ICP-OES.

Wastewater Collection

Figure 12:
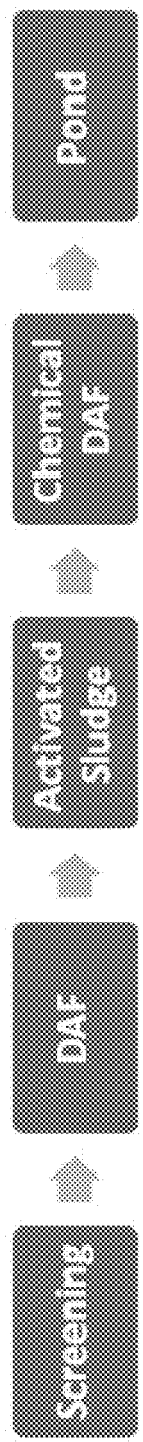
FIG. 12 illustrates the poultry wastewater treatment process, in accordance with one or more embodiments of the present disclosure.

Poultry processing wastewater samples were collected at a local poultry processing plant. The wastewater treatment system contains screening to remove the large particulates, dissolved air flotation (DAF) system to remove suspended solids, oil, and grease, an activated sludge system to reduce BOD and COD, a chemical DAF to remove excess TP and an equalization pond. Final effluent of pond is discharged to public municipal system, as shown in FIG. 12. Wastewater samples were collected from the effluent of physical screening (raw), effluent of DAF (DAF), effluent of biological treatment (bio), effluent of chemical DAF (chemical DAF) and the final effluent (pond) following the standard wastewater sampling procedures developed by EPA. One gallon of each wastewater sample was manually collected in acid-cleaned glass bottles, stored at 4° C. and transported to the lab for analysis. Samples were analyzed as soon as possible after collection. Portions of samples were preserved with $H_2SO_4$ and stored at 4° C. for COD, TKN and FOG tests if the analyses cannot be finished in 24 hours.

Wastewater Characterization

Parameters including chemical oxygen demand (COD), total suspended solids (TSS), total dissolved solids (TDS), fat-oil-grease (FOG), total Kjeldahl nitrogen (TKN), and total phosphates (TP) were measured for wastewater characterizations. COD was measured using the Hach method 8000 wherein 2 ml of wastewater samples were digested with a COD digestion reagent (Hach, Loveland, Co., USA) in a Hach DRB200 reactor for 2 hours. Then a Hach DR 3900 colorimeter was used to read the COD level. TKN was measured using the Hach method 10242 in which inorganic and organic nitrogen are oxidized to nitrate by digestion with peroxodisulfate. The difference of nitrate before and after the digestion was calculated as TKN. TSS and TDS were measured gravimetrically by filtering a known volume of wastewater (from 2 to 40 ml depending on the level of contamination) and measuring the weight of the residue on the filter after thorough drying (TSS). The filtrate was evaporated and the remaining residue was weighed (TDS). Hexane extractable FOG was measured gravimetrically by extracting 350 mL of water sample with multiple aliquots of 25 ml hexane followed by the evaporation of all of the solvent. The residue was weighed. Each measurement was duplicated and the averaged results were reported.

P Speciation

Figure 13:
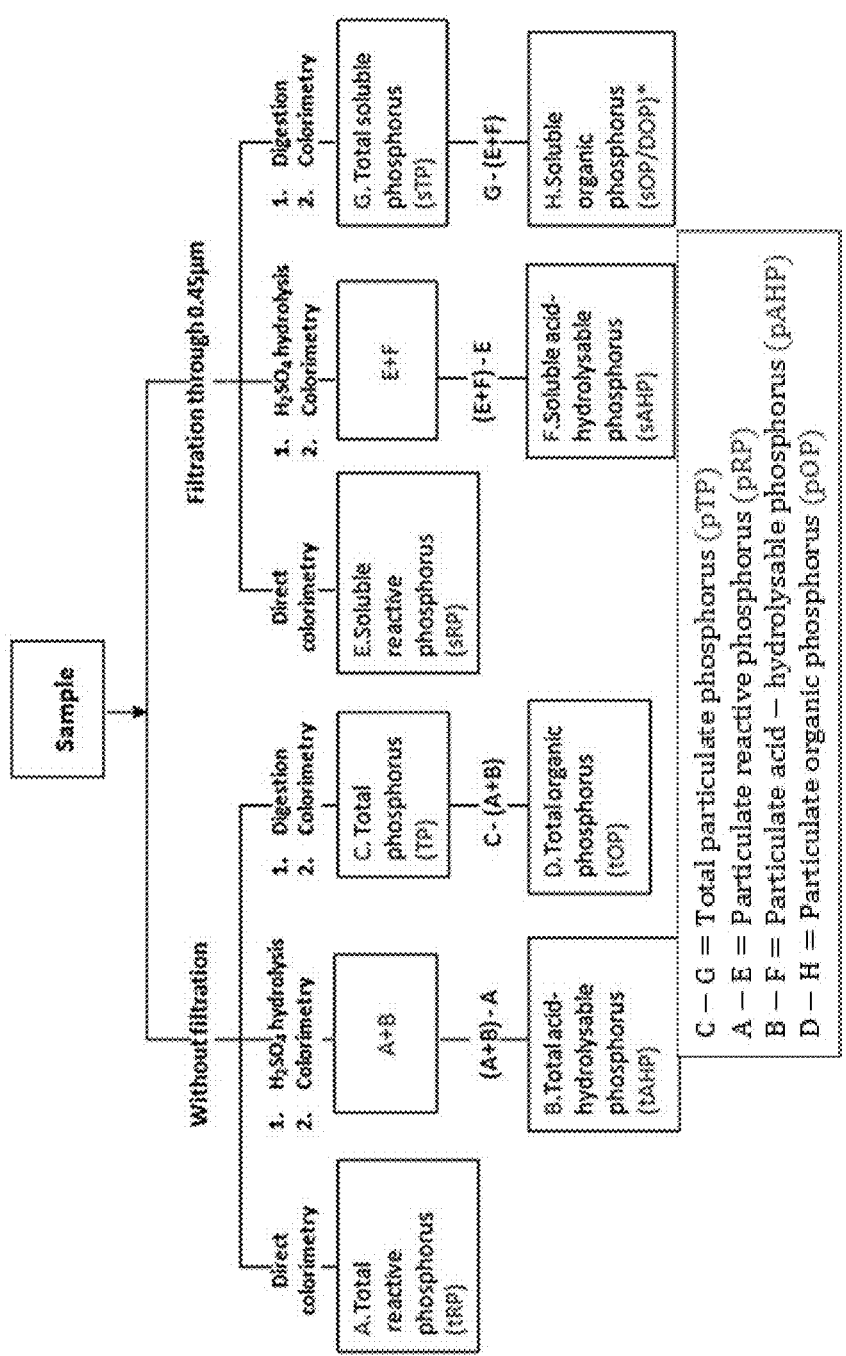
FIG. 13 summarizes the testing methods to be used to characterize P species in liquid streams, in accordance with one or more embodiments of the present disclosure.

P species in poultry wastewater samples were differentiated using EPA 365.2 method. In bodies of water, phosphorus is present in several soluble and particulate forms such as organically bound phosphorus, and inorganic orthophosphates. FIG. 13 summarizes the testing methods to be used to characterize these P species in liquid streams. Basically, wastewater samples were split into two portions. One portion was filtered through a 0.45 µm filter and the second portion was analyzed without any filtration. The unfiltered water sample was treated by three methods independently to obtain total reactive phosphorus (mainly orthophosphate A), total acid hydrolysable phosphorus (combination of orthophosphate A and polyphosphate B), total phosphorus C (orthophosphate A, polyphosphate B and organo P species D). Similar approaches were conducted on the filtered water samples to get soluble reactive phosphorus (E), total soluble acid hydrolysable phosphorus (combination of soluble orthophosphate E and soluble acid hydrolysable phosphorus F), and total soluble phosphorus G (E, F and organo P species H). The differences between C and G, A and E, B and F, and D and H generate the levels of P species in the particulate forms. Alternatively, total phosphorus in the filtered and unfiltered wastewater samples can be measured by ICP-OES method after acid digestion.

Ascorbic acid Colorimetric Method 4 mM potassium antimonyl tartrate solution, 0.03 M ammonium molybdate and 0.1 M ascorbic acid were prepared in DI waster. A combined reagent mixture was created by mixing 50 ml of 5 N sulfuric acid, 5 ml potassium antimonyl tartrate solution, 15 ml ammonium molybdate solution, and 30 ml ascorbic acid solution in order at room temperature. Next, 1.6 ml of the reagent mix were added to 10 ml of each sample. After ten minutes, each sample had its absorbance measured at 880 nm by UV-vis.

Acid Hydrolysis for Total Acid Hydrolysable Phosphorus Analysis

An acid mixture containing 5.4M $H_2SO_4$ and 0.06M $HNO_3$ solution was prepared in DI water. 100 µl of the acid solution were added to 10 ml of each of the wastewater samples. The samples were then placed in an autoclave for 30 minutes at 121° C. The samples were allowed to cool to room temperature, and had the ascorbic acid test performed on each sample, then had the absorbencies measured by UV-vis.

Acid Digestion for Total Phosphorus Analysis

200 µl of 5.4M sulfuric acid and 80 mg of ammonia persulfate were added to 10 ml of each wastewater sample. The samples were then placed in an autoclave for 30 minutes at 121° C. The samples were allowed to cool to room temperature and had the ascorbic acid test performed on each sample, then had the absorbencies measured by UV-vis.

Phosphate Adsorption Experiment

Phosphate removal studies: Each wastewater sample had its total phosphorous concentration measured by ICP. The mass ratio of Al-MNP to TP in 50:1 was used for wastewater treatment. Al-MNPs were added to 50 ml centrifuge tubes containing 40 ml of each waste water sample and the tubes were placed on a wrist-action shaker for about one hour, then placed in a magnetic separator. The supernatants were drawn from the tubes after ten minutes on the separator, then had their new phosphorous concentrations measured by ICP. Phosphorus removal efficiency at time t was calculated as:

$$\% \text{ removal} = \frac{C_0 - C_t}{C_0} \times 100\% \quad \text{Equation 10}$$

where $C_o$ and $C_t$ are the concentrations of P before and after 1 hour of the Al-MNP treatment.

Results and Discussion

Nanomaterial Characterization

Figure 14:
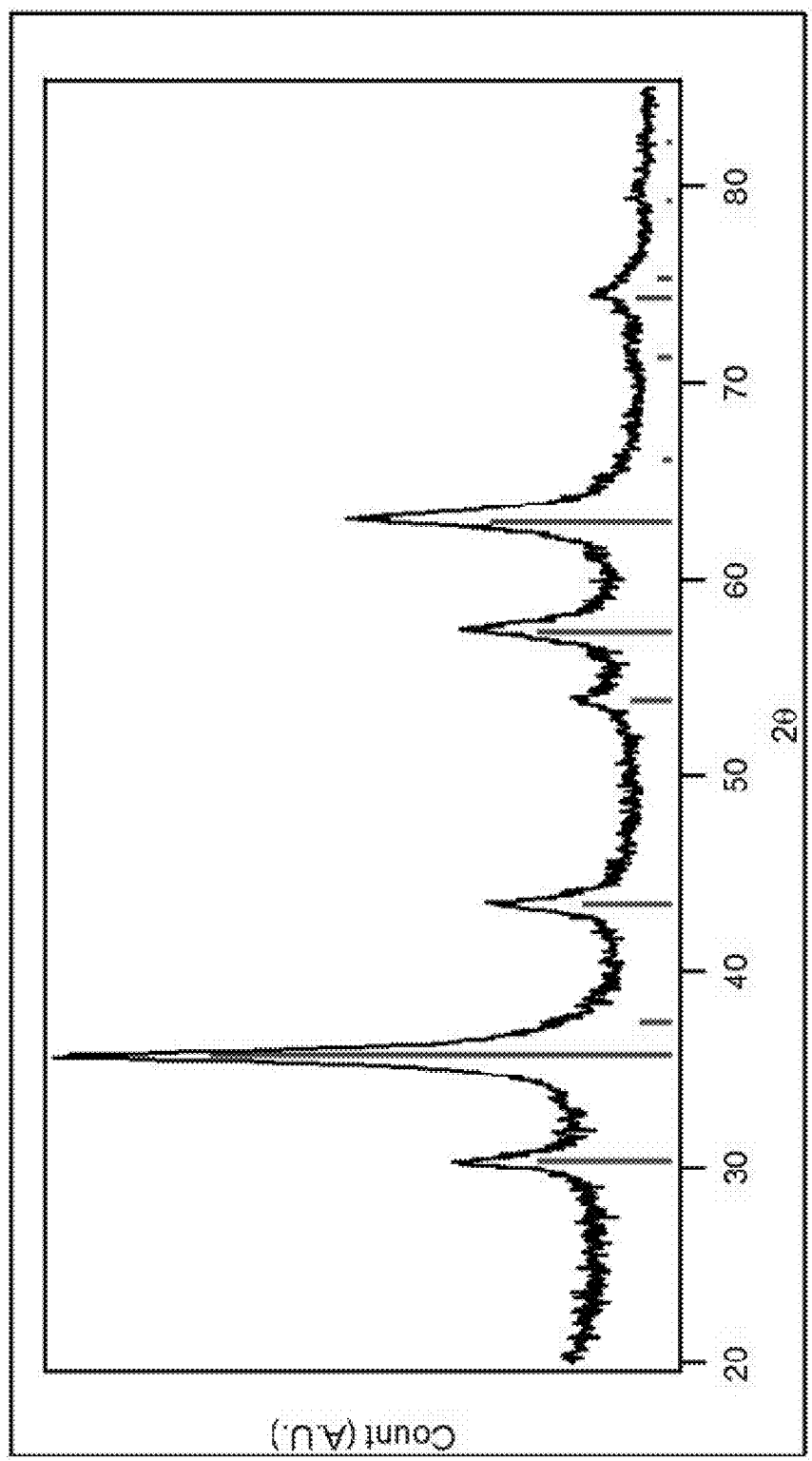
FIG. 14 shows x-ray diffraction patterns of pure and Al-doped magnetite, in accordance with one or more embodiments of the present disclosure.

Prepared magnetic materials were characterized using XRD, SEM and magnetometer to measure the crystalline structure, particle size and magnetic properties, respectively. The locations and intensities of peaks in the X-ray diffraction pattern (FIG. 14) of the Al-MNP are in agreement with the standard magnetite (red lines) JCPDS card (card no. 19-0629), indicating a magnetite structure with aluminum fully incorporated in the cubic inverse spinel lattice. The formation of solid solution $Fe_3O_4$—$FeAl_2O_4$ was confirmed previously and the lattice constant of the doped $Fe_3O_4$—$FeAl_2O_4$ solid solution was reduced, compared to the pure $Fe_3O_4$. The averaged crystallite size was estimated using XRD, and the results indicated that the averaged grain size was about 9.9 nm in Al-MNP.

Figure 15:
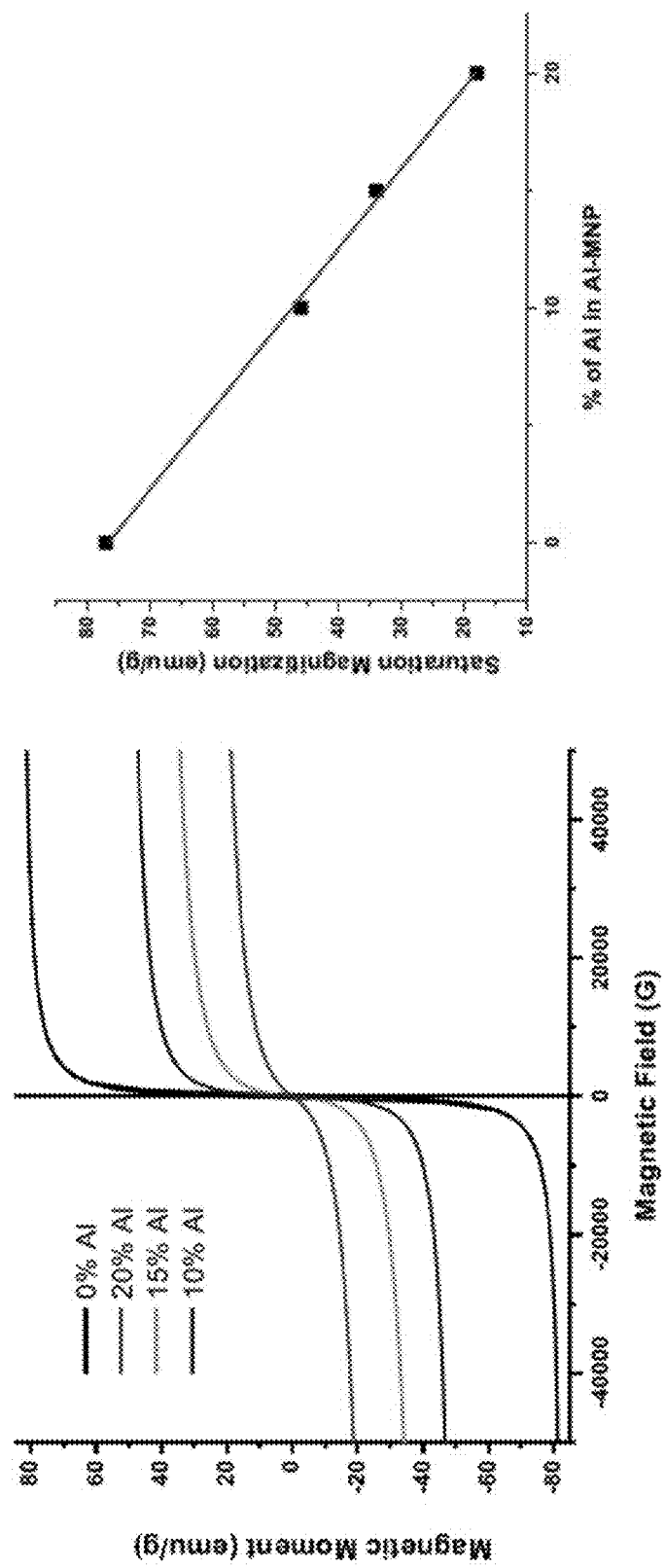
FIG. 15 shows magnetic moment measurements for pure and Al-MNPs, in accordance with one or more embodiments of the present disclosure.

The saturation magnetization of the prepared Al-MNP displayed superparamagnetism without hysteresis and remnant magnetization at room temperature. The saturation magnetizations of Al-MNP are negative correlated with the doping level of Al. They are 77, 46, 34 and 18 emu/g for 0%, 10%, 15% and 20% of Al doping respectively as shown in FIG. 15. The linear reduced magnetization for Al-MNP could be explained by the replacement of $Fe^{3+}$ by nonmagnetic $Al^{3+}$ in octahedral sites in a face-centered cubic lattice structure. Al-MNP with 20% of Al doping was used in this study due to the higher adsorption capacity toward P species.

Wastewater Characterization

The treatment methods for poultry processing wastewater vary greatly depending on the discharge methods; either by indirect discharge (the treated wastewater is sent to a publicly owned treatment plant) or by direct discharge (treated wastewater is discharged into a stream or other receiving water body). Almost 94% of poultry processing plants are indirect dischargers. Wastewater samples were collected from a poultry processing plant where the wastewater is indirectly discharged. The plant processes about 200,000 birds/day with average wastewater flow of 1.7 million gallon per day. A series of wastewater treatment steps including DAF systems and aerobic system, as shown in FIG. 12, are followed to reduce the contamination levels. Polymer based coagulants are added in the DAF system to assist the removal of suspended particles. The effluent of DAF is then transferred to a completely mixed, activated sludge tank designed to address soluble COD and BOD. The effluent from the biological treatment is further treated in chemical DAF, where ferric salt and polymers are added to reduce TP. The effluent from chemical DAF and the stormwater runoffs are sent to an equalization pond before they are discharged to a publicly owned Treatment Works (POTW).

Changes in contamination levels were monitored by collecting wastewater samples after each step of the treatment process. Parameters including pH, COD, TSS, TDS, FOG, TKN, and TP were characterized. The results are listed in Table 5 below. The post screening effluent (Raw) contains high levels of COD, TSS, FOG, TKN and TP. The level of contaminants in Raw are in good agreements with the reported literature values. After the chemically enhanced DAF treatment, more than 98% of TSS and 90% of FOG were removed. Moderate removals of other contaminants were achieved including reductions of COD by 67%, TKN by 52%, and TP by 36%. These removed contaminants were likely associated with the suspended solids. It has been reported that 40% to 50% of COD in screened (1 mm mesh) effluent of meat processing wastewater was in coarse suspended form. This varies considerably from domestic wastewater, in which the COD is present mainly in the soluble and colloidal forms.

TABLE 5

Wastewater characterization before and after MNP treatment

| Type | pH | COD (ppm) | FOG (ppm) | TSS (ppm) | TDS (ppm) | Total N (ppm) | | TP (ppm) |
| | | | | | | $NO_3 + NO_2$ | TKN | |
| --- | --- | --- | --- | --- | --- | --- | --- | --- |
| Raw | 5.4 | 3495 ± 49 | 517 ± 21 | 1195 ± 21 | 865 ± 64 | 6.59 ± 1.33 | 140 ± 9.89 | 51.2 ± 3.89 |
| treated | | 439 ± 0.71 | 3 ± 2 | 41 ± 14 | 670 ± 14 | 4.52 ± 2.43 | 62.6 ± 13.5 | 3 ± 0.07 |
| Reduction % | | 87.4 | 99.4 | 96.6 | 22.5 | 31.4 | 55.3 | 94.1 |
| DAF | 5.1 | 715 ± 7 | 18 ± 12 | 17 ± 5 | 852 ± 24 | 3.62 ± 0.32 | 66.8 ± 1.48 | 39.58 ± 0.32 |
| Treated | | 401 ± 4.24 | 4 ± 3 | 36 ± 18 | 680 ± 12 | 4.46 ± 0.97 | 57.6 ± 9.05 | 1.66 ± 0.06 |
| Reduction % | | 43.9 | 77.8 | −118 | 20.2 | NA | 13.8 | 95.8 |
| Biological | 6.8 | 1160 ± 71 | 107 ± 10 | 600 ± 0 | 625 ± 0 | 3.14 ± 0.62 | 110.3 ± 15.13 | 55.77 ± 1.48 |
| Treated | | 192 ± 0.71 | 18 ± 10 | 148 ± 68 | 658 ± 3 | 2.95 ± 0.73 | 66.5 ± 3.61 | 2.86 ± 0.006 |
| Reduction % | | 83.4 | 83.2 | 75.3 | NA | 6.05 | 39.5 | 94.9 |
| Chemical DAF | 6.5 | 226 ± 4 | BD | 70 ± 38 | 657 ± 9 | 1.96 ± 0.09 | 88.85 ± 29.9 | 4.7 ± 0.19 |

TABLE 5-continued

Wastewater characterization before and after MNP treatment

| Type | pH | COD (ppm) | FOG (ppm) | TSS (ppm) | TDS (ppm) | Total N (ppm) $NO_3 + NO_2$ | Total N (ppm) TKN | TP (ppm) |
|---|---|---|---|---|---|---|---|---|
| Treated | | 187 ± 2.12 | NA | 36 ± 18 | 698 ± 6 | 2.58 ± 0.41 | 72.2 ± 4.81 | 0.59 ± 0.03 |
| Reduction % | | 17.3 | NA | 48.6 | NA | NA | 18.4 | 87.4 |
| Pond | 6.7 | 111 ± 4 | BD | 127 ± 47 | 623 ± 5 | 2.23 ± 1.69 | 88.25 ± 0.78 | 12.18 ± 0.41 |
| Treated | | 77.5 ± 3.53 | NA | 48 ± 4 | 641 ± 14 | 2.84 ± 0.19 | 73.6 ± 0.78 | 1.19 ± 0.03 |
| Reduction % | | 30.2 | NA | 62.2 | NA | NA | 16.6 | 90.2 |

Dissolved air flotation (DAF) is applied widely in the pretreatment of industrial wastewater. Air in the DAF system is usually dissolved in water under pressure (400-600 kPa) in a saturator and microbubbles are released through nozzles or special valves at the bottom entrance to the contact zone. In the contact zone, microbubbles attach to flocs to produce bubble-floc aggregates. Then the bubble-floc aggregates are separated from water due to the density difference in the separation zone. Flocculants and/or coagulants may be added in the removal of targeted contaminants such as solids/fats to enhance the performance of DAF. Typical reductions of COD, TSS and FOG are in the range of 50% to 80% depending on the air pressure and the type of flocculants inside the DAF. DAF has also been used to remove TP in the meat processing wastewater.

The DAF effluent was delivered to an activated sludge treatment system to remove organic matters. However, it only reduced COD by 13%. In addition, the amount of TSS increased from 17 ppm to 600 ppm, FOG from 18 ppm to 107 ppm, TKN increased from 66.8 ppm to 110 ppm, and TP increased from 18.6 ppm to 50.6 ppm. These increases could be attributed to the presence of unsettled sludge in the effluent.

Activated sludge system is used to reduce BOD and COD, and to convert ammonia to nitrate. The typical removal rate for COD, TP, TKN are in the range of 80 to 90%. However, we only observed a 13% reduction of COD while levels of TP, suspended solids and TKN were increased, indicating the biological treatment was not working properly. The performance of the aerated biological treatment is dependent on the many factors including hydraulic retention time, the age and health of the sludge. A sludge age of 5-20 days is recommended for treating slaughterhouse wastewater as proteins are less readily biodegradable than simple molecules. In addition, one limitation of this technology is the poor settling floc in activated sludge systems while treating slaughterhouse wastewater. This was due to a combination of the high fat content of the influent and a low DO concentration in the activated sludge reactor. The increased TSS, TP and TKN in the effluent are likely remnants from the unsettled floc.

The effluent of activated sludge was send to another DAF system to remove TP, where the level of TP was reduced TP from 50.6 ppm to 4.14 ppm with additional removals of COD and TSS. The level of FOG was below the detection limit after this step of treatment. The effluent of chemical DAF was sent to an equalization pond where the stormwater runoffs were also collected. The final effluent was then discharged to POTW. It's interesting to note, compared to the effluent of chemical DAF, that the level of COD was 50% reduced in the final effluent of equalization pond while the levels of TSS, TKN and TP were all increased. The level of TDS remains relative unchanged along the treatment process. It's speculated that the increased TSS, TKN and TP were from inorganic sources in the equalization pond or stormwater runoffs in the processing facility.

Chemical based P removal processes convert the soluble P species into the particulate forms which are then separated from the liquid using DAF treatment (chemical DAF). Chemical DAF was typically applied after the biological treatment as the effluent of biological treatment has better quality and is more stable. The local poultry processing plant uses both ferric salts and cationic polymers in chemical DAF to remove TP. It was observed that above 90% of TP was removed in the chemical DAF, which was in good agreement with the reported performance.

P Speciation in Poultry Wastewater

For phosphorus, most permit limits are based on TP so all forms of P in the final effluent need to be considered for P reduction. The forms of P are classified based on their solubility (pass 0.45 μm filter) and reactivity in acid. Both particulate and soluble form of phosphorus can be fractionized into reactive phosphorus (normally assumed as ortho-P), acid hydrolysable phosphorus (e.g. polyphosphate and condensed P), and organic phosphorus (e.g. intracellular molecules that contain phosphorus).

Figure 16:
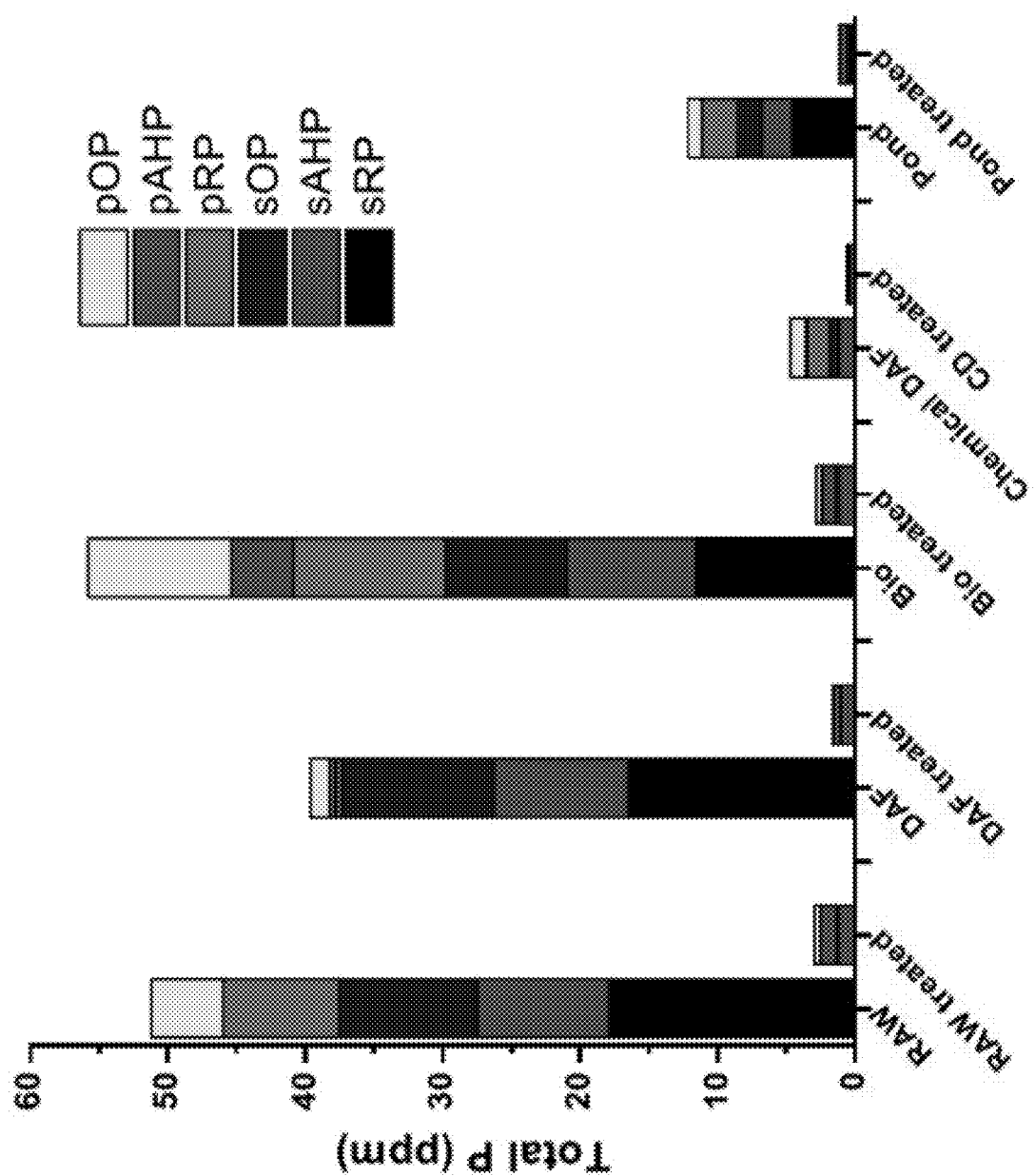
FIG. 16 illustrates the distribution and comparison of P species in wastewater before and after Al-MNP treatment for the samples collected at different stages of wastewater treatment, in accordance with one or more embodiments of the present disclosure.
Figure 17:
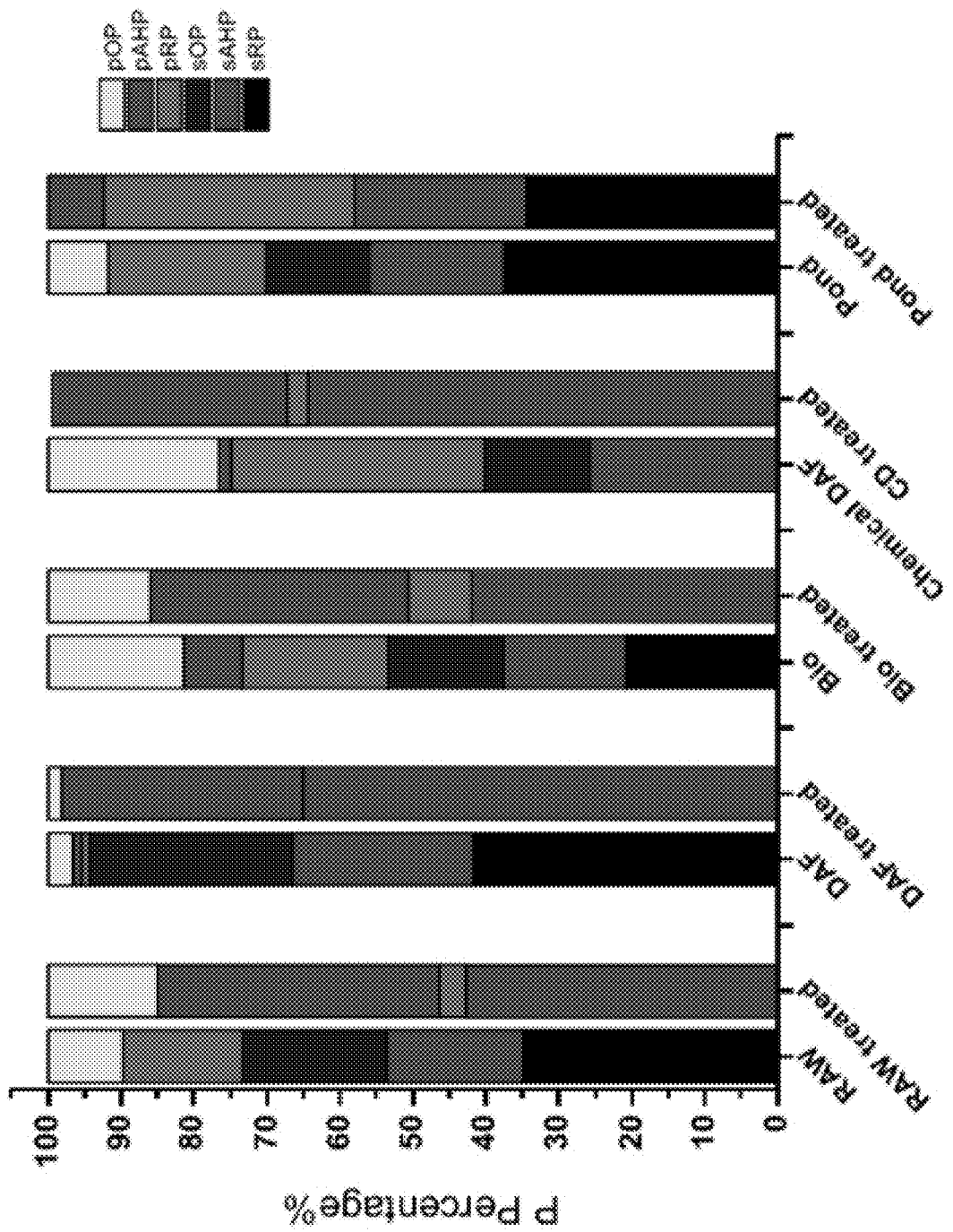
FIG. 17 illustrates the percentage distribution of each P species in wastewaters before and after Al-MNP treatment for samples collected at the different stages of wastewater treatment, in accordance with one or more embodiments of the present disclosure.

P speciation analyses on wastewater samples collected at different treatment stages were conducted to understand the effects of each treatment stage on the distribution and variation of P species. As FIGS. 16 and 17 show, the TP in the raw influent is composed of 35% sRP, 19% sAHP, 20% sOP, 16% pRP and 10% pOP. A study indicated that the TP in municipal effluent from primary clarifiers contains roughly 60% soluble reactive phosphate (sRP), 17% particulate reactive phosphate (pRP), 20% acid hydrolysable phosphorus in the particulate form (pAHP), 3% of organic phosphorus in both soluble and particulate forms. And the wastewater from the dairy processing industry contained 23.14% sRP, 15.3% sAHP, 50.9% sOP, 8.5% pRP, 1% of pAHP and 1.2% pOP of the TP. Compared to the composition of P species in the effluent of a primary clarifier in a sewage treatment plant, the percentages of sRP and sAHP in food processing wastewater are lower while the percentages of sOP and pOP are higher. Acid hydrolysable phosphorus are mainly condensed phosphate and they are used in water treatment to prevent scale formation and corrosion control.

After the first DAF treatment, all the P species in particulate forms were reduced significantly while the soluble P species remained at similar levels. Aerobic biological treatment reduced some soluble forms of P (29.6% reduction of sRP and 20% reduction of sOP), which is low compared to a step-feed biological nutrient removal system where over 95% of sRP was removed. In addition, total particulate phosphorus (TPP) was increased dramatically due to the unsettled sludge in the effluent. The distribution of P species can be found in Table 6 below. Almost half of TP were from TPP.

TABLE 6

P Speciation in wastewater before and after the MNP treatment

| | TP | TsP | sRP | sAHP | sOP | TpP | pRP | pAHP | pOP |
|---|---|---|---|---|---|---|---|---|---|
| RAW | 51.2 | 37.55 | 17.9 | 9.59 | 10.06 | 13.65 | 8.4 | 0 | 5.25 |
| Treated | 3 | 1.28 | 0 | 1.28 | 0 | 1.72 | 0.11 | 1.16 | 0.45 |
| Reduction % | 94.14 | 96.59 | 100 | 86.65 | 100 | 87.39 | 98.69 | 0 | 91.42 |
| DAF | 39.58 | 37.34 | 16.53 | 9.78 | 11.03 | 2.24 | 0.43 | 0.48 | 1.33 |
| Treated | 1.66 | 1.08 | 0 | 1.08 | 0 | 0.58 | 0 | 0.55 | 0.03 |
| Reduction % | 95.80 | 97.10 | 100 | 88.95 | 100 | 74.10 | 100 | 0 | 97.74 |
| Bio | 55.77 | 29.8 | 11.64 | 9.32 | 8.84 | 25.97 | 11.11 | 4.45 | 10.41 |
| Treated | 2.86 | 1.2 | 0 | 1.2 | 0 | 1.66 | 0.25 | 1.01 | 0.4 |
| Reduction % | 94.87 | 95.97 | 100 | 87.12 | 100 | 93.60 | 97.74 | 77.30 | 96.15 |
| Chemical DAF | 4.7 | 1.89 | 0 | 1.21 | 0.68 | 2.81 | 1.63 | 0.08 | 1.1 |
| Treated | 0.59 | 0.38 | 0 | 0.38 | 0 | 0.21 | 0.017 | 0.19 | 0 |
| Reduction % | 87.44 | 79.89 | NA | 68.59 | 100 | 92.52 | 98.95 | 0 | 100 |
| Pond | 12.18 | 8.54 | 4.57 | 2.25 | 1.72 | 3.64 | 2.64 | 0 | 1 |
| Treated | 1.19 | 0.69 | 0.41 | 0.28 | 0 | 0.5 | 0.41 | 0.09 | 0 |
| Reduction % | 90.22 | 91.92 | 91.02 | 87.55 | 100 | 86.26 | 84.46 | 0 | 100 |

Chemical DAF not only removed all the sRP but reduced other P species dramatically with combined precipitation and adsorption processes. TPP in the effluent of chemical DAF are about 60% of TP, where pRP is the major form of TPP (60%) and followed by pOP (~40%). It has been reported that P was predominantly bound to iron in the suspended solids (particulates greater than 0.45 μm) when ferric chloride was used in wastewater treatment. $FeCl_3$ reacted not only with dissolved orthophosphate, but also with organic compounds containing P. The primary pOP might be orthophosphate monoester and orthophosphate diester species.

The composition of TP in the final effluent consisted of 37.5% sRP, 18.5% sAHP, 14% sOP, 21.5% pRP, and 8.5% pOP. The composition of sRP was low compared to the discharge of a typical sewage treatment plant, where the percentage of sRP is in the range of 75% to 90%. The higher percentage of sRP in the discharge of sewage treatment posed a greater risk for similar amounts of total P released to the body of water.

Wastewater Characterization after MNP Treatment

Wastewater parameters were characterized after Al-MNP treatment to understand the impacts of the treatment on TP and other pollutants in wastewater. To compare the removal efficiencies of Al-MNP on TP in different types of wastewater, the mass ratio of Al-MNP to TP was kept constant at 50:1 (Al-MNP:TP), which was selected based on the maximum adsorption capacity and contact time. Treated wastewaters were characterized to determine the removal efficiencies on the wastewater parameters the including COD, TSS, TDS, FOG, TKN and TP. The results can be found in Table 5, above. The removal efficiencies on TP ranged from 87.4% in the effluent of chemical DAF to 95.8% in the effluent of DAF. The relative lower removal efficiencies in effluents of chemical DAF could be caused by the presence of excess ferric chloride in chemical DAF, which may interfere for the availability of phosphate. About 95% of TP were removed from the influents of DAF, biological treatment and chemical DAF, indicating high removal efficiency on TP regardless the compositions of P species.

In addition to TP removal, significant reductions on COD, FOG, and TSS were also observed in the Al-MNP treated raw wastewater with the removal efficacies of 87.4%, 99.4% and 96.6% respectively. The removal efficacies for TDS, nitrate nitrogen and TKN were moderate with removal efficiencies of 22.5%, 31.4% and 55.3% respectively. For the effluent of DAF, the removal efficiencies of COD and FOG were 43.9%, and 77.8% respectively. However, the level of TSS increased from 17 ppm to 36 ppm, a 118% increase. This increase in TSS is likely resultant from experimental limitations as the amount of TSS present was approaching the detection limit of the method. It was observed that lower COD reduction was typically obtained for the wastewater samples contained less TSS, indicating that COD associated with TSS were removed efficiently with Al-MNP along with the TSS removal.

Activated carbon is used commonly to reduce COD in wastewater. Powdered activated carbon and powdered zeolite can only remove 38% and 17% of COD, respectively, in landfill leachate after 30 hours of treatment, while in another study, a 30% to 50% of COD reduction in dairy wastewater was observed using organo-zeolite. The enhanced adsorption efficacy was attributed to the organic molecule (stearin-dimethyl-benzyl ammonium chloride) used for zeolite modification. The same material could remove 70% of nitrate nitrogen and 20% of phosphate. About 42% of COD and 69% of TSS reduction were obtained using porous concrete containing iron slag and sand filtration removed 11% of COD and 53% of TSS in storm runoffs. Granular ferric hydroxide adsorbent yielded a 16% COD removal in the secondary effluents of a municipal wastewater treatment. Comparing to the reported adsorbents, our Al-MNP removed the major wastewater contaminants favorably.

P Speciation in Treated Wastewater

P speciation was conducted in the treated wastewaters to examine the removal preference of Al-MNP on P species. The results can be found in Table 6 above. It was observed that almost all reactive phosphorus (orthophosphate) and organic phosphorus either in soluble or particulate forms were removed preferably over acid hydrolysable phosphorus (polyphosphate), as shown in FIGS. 16 and 17. The total soluble P residuals (TsP) in the treated Raw, DAF, bio, chemical DAF and pond were roughly 43%, 65%, 42%, 65% and 58% of TP respectively while the percentages of TsP before the treatment were 73.3%, 94.3%, 53.4%, 40.2% and 70.1% respectively. Reduced TsP removal was observed in the effluent of chemical DAF. This may be caused by the presence of ferric chloride, which may interfere with the adsorption of TsP on the active sites of Al-MNP.

MNP Residue in Treated Water

The contents of iron and aluminum in the treated wastewaters were compared to those before the Al-MNP treatment to determine the residue of Al-MNP in the treated wastewaters. The results can be found in Table 7, below. Negligible amount of Fe and Al can be found in all the treated wastewater indicating a complete solid/liquid separation under an application of an external magnet for ten minutes. In fact, the iron levels were even reduced in bio, chemical DAF, and pond wastewaters after Al-MNP treatment.

TABLE 7 iron and aluminum contents in wastewater

| | Fe (ppm) | | Al (ppm) | |
|---|---|---|---|---|
| | Before Al-MNP | After Al-MNP | Before Al-MNP | After Al-MNP |
| Raw | 0 ± 0 | 0.054 ± 0.0035 | 0.003 ± 0 | 0 ± 0 |
| DAF | 0 ± 0 | 0.22 ± 0.14 | 0.029 ± 0.018 | 0.096 ± 0.0071 |
| Biological | 5.014 ± 0.18 | 0.24 ± 0.012 | 0.053 ± 0.011 | 0.0855 ± 0.011 |
| Chemical DAF | 1.23 ± 0.015 | 0.012 ± 0.0035 | 0 ± 0 | 0 ± 0 |
| Pond | 0.97 ± 0.07 | 0.07 ± 0.0057 | 0 ± 0 | 0.016 ± 0 |

CONCLUSION

Wastewater samples were collected at a local poultry wastewater treatment plant. They were characterized with high contamination levels of COD, FOG, TSS and TP. The first DAF system can remove over 98% of TSS, 90% of FOG, 67% of COD, 52% of TKN and 36% of TP; while over 90% of TP reduction was achieved in the chemical DAF. P speciation analysis was performed on the wastewater collected at the different treatment stages to monitor the changes and removal of P species. The percentages of TsP varied from 73%, 94%, 53%, 40% and 70% of TP along the treatment chain. Particularly, the bioavailable sRP varied from 35%, 42%, 21%, 0%, and 38% at the different treatment stages. Treatment of Al-MNP on wastewater samples not only reduced TP significantly (over 90%) in all the wastewater samples but also decreased the levels of other contaminants including COD (20% to 87%), TSS (50% to 97%), and FOG (78% to 99%). Based on these removal efficiencies, the suggested application point of Al-MNP in the poultry wastewater treatment process will be to treat the effluent of DAF, where the COD, FOG and TSS have been removed significantly. The combination of low cost and ease of application make the Al-MNP a promising material for wastewater treatment.

I claim:

1. A method comprising:
  introducing aluminum-doped nanoparticles to a fluid comprising water and a contaminate selected from the group consisting of a phosphorus species, chemical oxygen demand, suspended solids, dissolved solids, a fat, an oil, a grease, and a combination thereof;
  contacting at least a portion of the aluminum-doped nanoparticles with at least a portion of the contaminate to form contaminate-adsorbed nanoparticles; and
  isolating at least a portion of the contaminate-adsorbed nanoparticles by applying a magnetic field to the fluid;
  wherein the aluminum-doped nanoparticles are synthesized from a mixture of ferric salt, ferrous salt, and aluminum salt with sodium hydroxide, and are characterized by a maximum contaminate adsorption capacity of greater than 50 mg/g based on the Langmuir model.

2. The method of claim 1, wherein an isolation efficiency of the contaminate-adsorbed nanoparticles is pH-independent in the range of the fluid pH from 4 to 9.

3. The method of claim 1, wherein the aluminum-doped nanoparticles are characterized by a maximum contaminate adsorption capacity of greater than 81 mg/g based on the Langmuir model.

4. The method of claim 1 wherein the aluminum-doped nanoparticles are characterized by a maximum contaminate adsorption capacity of greater than 102 mg/g based on the Langmuir model.

5. The method of claim 1 further comprising removing at least a portion of the contaminate-adsorbed nanoparticles from the liquid.

6. The method of claim 1 further comprising synthesizing the aluminum-doped nanoparticles prior to introducing the aluminum-doped nanoparticles to the fluid.

7. The method of claim 1, wherein the aluminum-doped nanoparticles comprise 20 to 50% aluminum.

8. The method of claim 1, further comprising regenerating at least a portion of the aluminum-doped nanoparticles.

9. The method of claim 8, wherein regenerating comprises contacting at least a portion of the contaminate-adsorbed nanoparticles with aluminum sulfate.

10. A method for removing phosphorus species from wastewater comprising: introducing aluminum-doped nanoparticles synthesized from a mixture of ferric salt, ferrous salt, and aluminum salt with sodium hydroxide to wastewater having a pre-removal concentration of phosphorus species, the aluminum-doped nanoparticles configured to adsorb at least a portion of the phosphorus species and form phosphorus-adsorbed nanoparticles; removing at least a portion of the phosphorus-adsorbed nanoparticles by subjecting at least a portion of the phosphorus-adsorbed nanoparticles to a magnetic field; and regenerating at least a portion of the phosphorus-adsorbed nanoparticles by precipitating them with a regeneration agent; wherein a post-removal concentration of phosphorus species of the wastewater after removal of at least a portion of the phosphorus-adsorbed nanoparticles is from between about 80 and 90% less than the pre-removal concentration of the phosphorus species of the wastewater; and wherein the aluminum-doped nanoparticles are characterized by a maximum contaminate adsorption capacity of greater than 50 mg/g based on the Langmuir model.

11. The method of claim 10, wherein a removal efficiency of the phosphorus-adsorbed nanoparticles is pH-independent in the range of the wastewater pH from 4 to 9.

12. The method of claim 10, wherein the phosphorous species is selected from the group consisting of an organophosphate, a polyphosphate, and a reactive phosphate.

13. The method of claim 10 further comprising synthesizing the aluminum-doped nanoparticles prior to introducing the aluminum-doped nanoparticles to the wastewater.

14. The method of claim 10, wherein the aluminum-doped nanoparticles comprise about 20 to 50% aluminum.

15. The method of claim 10, wherein the regeneration agent is aluminum sulfate.

16. Aluminum-phosphorus magnetic nanoparticles produced by the process comprising dissolving stoichiometric amounts of Al2(SO4)3, FeCl3, and FeCl2 in a fluid from a solution, increasing the pH of the solution with the addition of NaOH until precipitation of aluminum-doped magnetic nanoparticles; contacting the aluminum-doped magnetic nanoparticles with a phosphorus species mixture facilitating adsorption of the phosphorus species to a surface of the aluminum-doped magnetic nanoparticles forming aluminum-phosphorus magnetic nanoparticles; and isolating the aluminum-phosphorus magnetic nanoparticles by applying a magnetic field to the mixture; wherein the aluminum-phosphorus magnetic nanoparticles are characterized by a maximum contaminate adsorption capacity of greater than 50 mg/g based on the Langmuir model.

17. The aluminum-phosphorus magnetic nanoparticles of claim 16, wherein the phosphorus species is a particulate phosphorus or soluble phosphorus; and wherein the fluid is deionized water.

18. The aluminum-phosphorus magnetic nanoparticles of claim 16 produced by the process further comprising:
heating the solution prior to increasing the pH of the solution; and
heating the solution during the addition of NaOH.

19. The method of claim 5, wherein a contaminate concentration of the fluid after removal of at least a portion of the contaminate-absorbed nanoparticles is from about 40% to about 97% less than a contaminate concentration of the fluid prior to forming the contaminate-adsorbed nanoparticles.

* * * * *